(12) United States Patent
Ben-David et al.

(10) Patent No.: US 11,379,827 B2
(45) Date of Patent: Jul. 5, 2022

(54) SMART CONTRACT EXECUTED WITHIN A BLOCKCHAIN

(71) Applicant: Lendoit Technologies Israel Ltd., Sderot (IL)

(72) Inventors: Avi Ben-David, Savyon (IL); Vladislav Amirov, Ashdod (IL); Ori Erez, Sderot (IL); Yoav Pinkas, Ganei Tikva (IL)

(73) Assignee: Lendoit Technologies Israel Ltd., Sderot (IL)

( * ) Notice: Subject to any disclaimer, the term of this patent is extended or adjusted under 35 U.S.C. 154(b) by 48 days.

(21) Appl. No.: 15/954,696

(22) Filed: Apr. 17, 2018

(65) Prior Publication Data

US 2019/0318346 A1   Oct. 17, 2019

(51) Int. Cl.
*G06Q 20/36* (2012.01)
*H04L 67/10* (2022.01)
(Continued)

(52) U.S. Cl.
CPC ..... *G06Q 20/3678* (2013.01); *G06Q 20/0658* (2013.01); *G06Q 20/3674* (2013.01);
(Continued)

(58) Field of Classification Search
CPC .......... G06Q 20/3678; G06Q 20/0658; G06Q 20/3674; G06Q 20/3829; G06Q 40/025;
(Continued)

(56) References Cited

U.S. PATENT DOCUMENTS 5,799,088 A * 8/1998 Raike .................... H04L 9/3093
380/46
6,141,422 A * 10/2000 Rimpo .................. H04L 9/0822
708/277
(Continued)

FOREIGN PATENT DOCUMENTS

CN   106157142   11/2016
CN   106682983   5/2017
(Continued)

OTHER PUBLICATIONS

McCorry, P, Shahandashti, SF & Hao, F; "A Smart Contract for Boardroom Voting with Maximum Voter Privacy"; 'A Smart Contract for Boardroom Voting.PDF' (Year: 2017).*
(Continued)

*Primary Examiner* — John W Hayes
*Assistant Examiner* — Edgar R Martinez-Hernandez

(57) ABSTRACT

There is provided a method and system for selection of response message(s), comprising: receiving from an initiator client terminal a function message including an unencrypted target value and a public key, receiving respective response messages to the function message from responding client terminals, each respective response comprising an unencrypted partial value of the target value and a parameter encrypted with the pubic key, receiving, from the initiator client terminal, a selection of response message(s) according to a ranking of the encrypted parameters, wherein a sum of the unencrypted partial values of the selected response message(s) is according to a requirement of the target value, (Continued)

and receiving a validation for the selected response message(s) from corresponding responding client terminals, wherein each of the corresponding responding client terminals is provided with all partial values and all unencrypted parameters associated with all of the selected response message(s).

23 Claims, 19 Drawing Sheets

(51) Int. Cl.
| | |
|---|---|
| *H04L 9/06* | (2006.01) |
| *H04L 9/30* | (2006.01) |
| *H04L 9/14* | (2006.01) |
| *G06Q 40/04* | (2012.01) |
| *G06Q 20/06* | (2012.01) |
| *G06Q 20/38* | (2012.01) |
| *G06Q 40/02* | (2012.01) |
| *H04L 9/32* | (2006.01) |

(52) U.S. Cl.
CPC ....... *G06Q 20/3829* (2013.01); *G06Q 40/025* (2013.01); *G06Q 40/04* (2013.01); *H04L 9/0637* (2013.01); *H04L 9/14* (2013.01); *H04L 9/30* (2013.01); *H04L 9/3242* (2013.01); *H04L 67/10* (2013.01); *G06Q 2220/00* (2013.01)

(58) Field of Classification Search
CPC .. G06Q 40/04; G06Q 2220/00; H04L 9/0637; H04L 9/14; H04L 9/30; H04L 9/3242; H04L 67/10
USPC .......................................................... 705/67
See application file for complete search history.

(56) References Cited

U.S. PATENT DOCUMENTS

| | | | | |
|---|---|---|---|---|
| 9,870,508 | B1* | 1/2018 | Hodgson | G11B 27/10 |
| 11,139,955 | B1* | 10/2021 | So | G06F 21/645 |
| 2014/0040113 | A1* | 2/2014 | Emswiler | G06Q 30/08 |
| | | | | 705/38 |
| 2015/0058197 | A1* | 2/2015 | Shenkar | G06Q 50/01 |
| | | | | 705/38 |
| 2015/0379510 | A1* | 12/2015 | Smith | G06Q 20/3829 |
| | | | | 705/71 |
| 2017/0103468 | A1* | 4/2017 | Orsini | H04L 9/3239 |
| 2017/0140408 | A1* | 5/2017 | Wuehler | G06Q 30/0207 |
| 2017/0169508 | A1* | 6/2017 | Song | G06Q 20/223 |
| 2017/0213287 | A1* | 7/2017 | Bruno | G06Q 40/04 |
| 2017/0243177 | A1* | 8/2017 | Johnsrud | H04L 9/3236 |
| 2018/0039786 | A1* | 2/2018 | Naqvi | G07F 9/006 |
| 2018/0089758 | A1* | 3/2018 | Stradling | G06Q 20/065 |
| 2018/0204213 | A1* | 7/2018 | Zappier | H04L 63/10 |
| 2019/0370900 | A1* | 12/2019 | Emerick | G06Q 40/04 |
| 2021/0082044 | A1* | 3/2021 | Sliwka | G06Q 20/38215 |

FOREIGN PATENT DOCUMENTS

| | | |
|---|---|---|
| WO | WO 2017/218983 | 12/2017 |
| WO | WO 2019/202597 | 10/2019 |

OTHER PUBLICATIONS

Ethereum Contract Tutorial. Retrieved from https://github.com/ethereum/go-ethereum/wiki/Contract-Tutorial/f49ff0e27e2b96b9c52f7bc4764df741695ee4f8 on Jan. 24, 2018. 'Contract Tutorial—ethereum_go-ethereum.PDF' (Year: 2016).*
"How to build a Democracy on the blockchain". Retrieved from https://web.archive.org/web/20171107151921/https://ethereum.org/dao on Jan. 25, 2018. 'Create a Democracy contract in Ethereum. PDF' (Year: 2017).*
"The Biggest Crowdfunding Project Ever-The DAO-Is Kind Of A Mess"; Retrieved from https://www.wired.com/2016/06/biggest-crowdfunding-project-ever-dao-mess/on Feb. 22, 2018. 'The Biggest Crowdfunding Project Ever_WIRED.PDF' (Year: 2016).*
"Security Assurance for Smart Contract"; Ence Zhou, Song Hua, Bingfeng Pi, Jun Sun, Yashihide Nomura, Kazuhiro Yamashita, Hidetoshi Kurihara; (Year: 2018).*
International Search Report and the Written Opinion dated Jul. 22, 2019 From the International Searching Authority Re. Application No. PCT/IL2019/050441. (10 Pages).
Kosba et al. "Hawk: The Blockchain Model of Cryptography and Privacy-Preserving Smart Contracts", 2016 37th IEEE Symposium on Security and Privacy, San Jose, CA, USA, May 23-25, 2016, p. 1-32, May 23, 2016.
Zou et al. "ALZA: An Efficient Hybrid Decentralized Payment System", arXiv Preprint aXiv:Submit/2310905 [cs.DC], p. 1-15, Jun. 27, 2018.

* cited by examiner

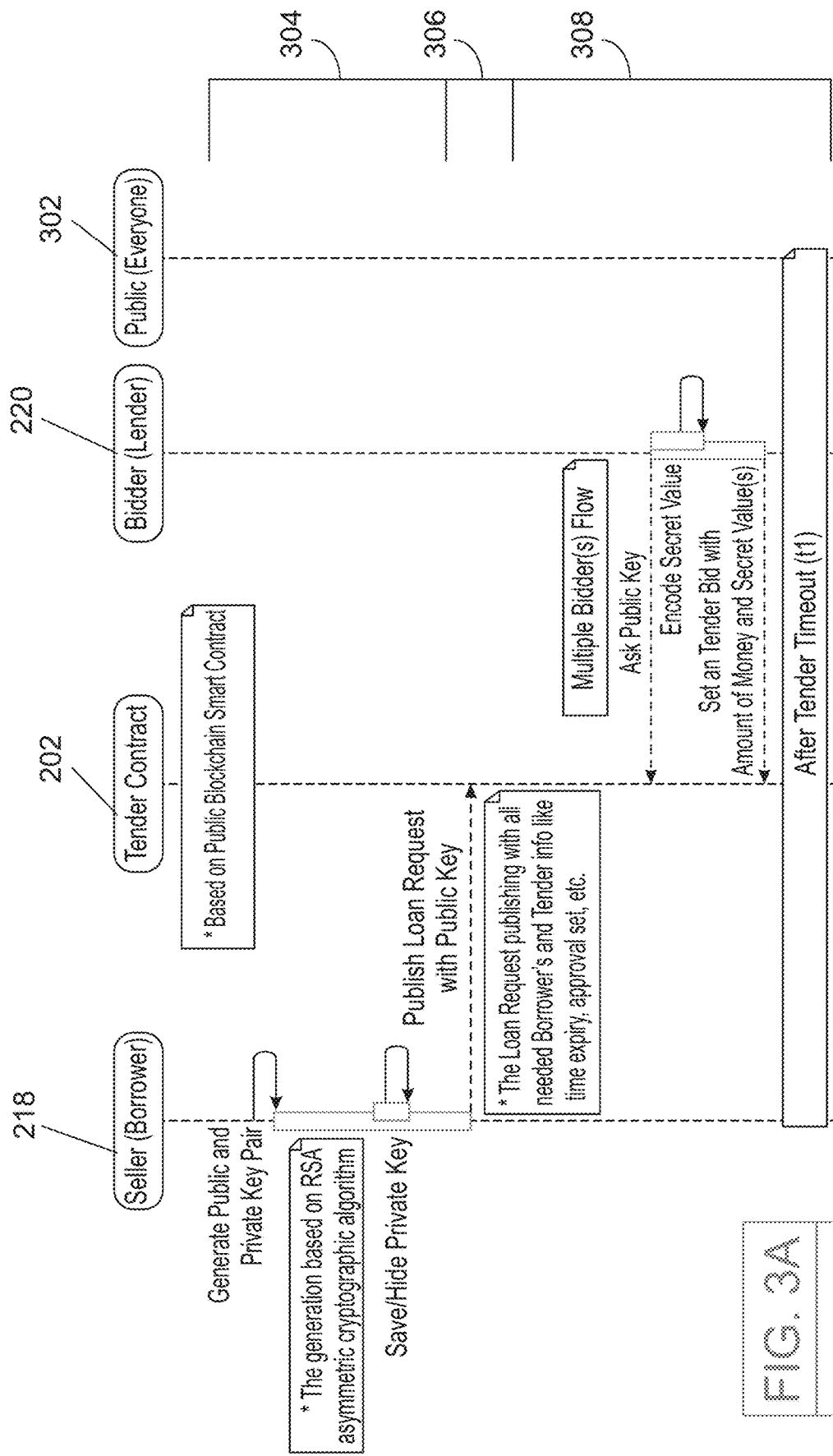

SMART CONTRACT EXECUTED WITHIN A BLOCKCHAIN

BACKGROUND

The present invention, in some embodiments thereof, relates to a blockchain data architecture and, more specifically, but not exclusively, to a smart contract executed within a blockchain.

A smart contract is a computer protocol intended to digitally facilitate, verify, or enforce the negotiation or performance of a contract. Smart contracts allow the performance of credible transactions without third parties. These transactions are trackable and irreversible. The transactions are publicly accessible and designed to be verifiably by the public.

SUMMARY

According to a first aspect, a system for selection of at least one response message from a plurality of response messages to a function message, the system comprises: at least one hardware processor executing a code of a distributed smart contract function of a blockchain dataset, the code comprising instructions for: receiving from an initiator client terminal a function message including an unencrypted target value, and a public key associated with a corresponding private key stored by the initiator client terminal, receiving respective response messages to the function message from a plurality of responding client terminals, each respective response comprising an unencrypted partial value of the target value and a parameter encrypted with the pubic key, receiving, from the initiator client terminal, a selection of at least one response according to a ranking of the encrypted parameters of the respective response messages, wherein a sum of the unencrypted partial values of the selected at least one response is according to a requirement of the target value, and receiving, an indication of a validation for the selected at least one response from corresponding responding client terminals, wherein each of the corresponding responding client terminals is provided with all partial values and all unencrypted parameters associated with all of the selected at least one response.

According to a second aspect, a method of selection of at least one response message from a plurality of response messages to a function message based on a distributed smart contract function of a blockchain dataset, the method comprises: receiving from an initiator client terminal a function message including an unencrypted target value, and a public key associated with a corresponding private key stored by the initiator client terminal, receiving respective response messages to the function message from a plurality of responding client terminals, each respective response comprising an unencrypted partial value of the target value and a parameter encrypted with the pubic key, receiving, from the initiator client terminal, a selection of at least one response according to a ranking of the encrypted parameters of the respective response messages, wherein a sum of the unencrypted partial values of the selected at least one response is according to a requirement of the target value, and receiving, an indication of a validation for the selected at least one response from corresponding responding client terminals, wherein each of the corresponding responding client terminals is provided with all partial values and all unencrypted parameters associated with all of the selected at least one response.

According to a third aspect, a computer program product for selection of at least one response message from a plurality of response messages to a function message, comprises: a non-transitory memory having stored thereon executing a code of a distributed smart contract function of a blockchain dataset for execution by at least one hardware processor, the code comprising: instructions for receiving from an initiator client terminal, a function message including an unencrypted target value, and a public key associated with a corresponding private key stored by the initiator client terminal, instructions for receiving respective response messages to the function message from a plurality of responding client terminals, each respective response comprising an unencrypted partial value of the target value and a parameter encrypted with the pubic key, instructions for receiving, from the initiator client terminal, a selection of at least one response according to a ranking of the encrypted parameters of the respective response messages, wherein a sum of the unencrypted partial values of the selected at least one response is according to a requirement of the target value, and instructions for receiving, an indication of a validation for the selected at least one response from corresponding responding client terminals, wherein each of the corresponding responding client terminals is provided with all partial values and all unencrypted parameters associated with all of the selected at least one response.

At least some implementations of the systems, methods, and/or code instructions (stored on a data storage device, executable by hardware processor(s)) described here relate to the technical problem of selecting one or more response messages to a function message (e.g., resolving bids for a tender for a loan), optionally between anonymous peers, in a secure manner, without a third party intermediary. Fraud, theft, censorship, and third-part interference are prevented or reduced, to ensure safe, effective, and trust worthy selections of response messages to a function message (e.g., transactions based on resolution of the bids for the tender of the loan).

At least some implementations of the systems, methods, and/or code instructions (stored on a data storage device, executable by hardware processor(s)) described here relate to the technical problem of reducing computational costs of executing the smart contract function code in the blockchain. As described herein, some features of the smart contract function are offloaded from the smart contract function to client terminals that communicate with the smart contract function.

At least some implementations of the systems, methods, and/or code instructions described herein improve performance of a computing device and/or processor(s) that host and execute smart contract function code of the blockchain. The improvement in performance is obtained, for example, by offloading some features from the smart contract function to the client terminals that communicate with the smart contract function. The improvement in performance may be significant, for example, when a large number of initiator client terminals access the same smart contract function code stored on the same server, by offloading processor computations from the server to the initiator client terminals. For example, when a large number of response messages are selected for the functional message, each responding client terminal may independently validate the responses using its own processor, rather than performing the validation on the blockchain, which reduces the processing load off the processor hosting the blockchain.

At least some implementations of the systems, methods, and/or code instructions described herein improve performance of network connected computing nodes (e.g., servers). The improvement in performance is obtained, for example, by improved security of the selected response messages to the function message (e.g., transactions resulting from the resolution of the bids for the tender for the loan). Improved security is provided, for example, by maintenance of multiple copies of the smart contract function code that when executed automatically manages the function message and response messages (e.g., the tender for the loan), and multiple copies of the selected response message (e.g., transaction resulting from the tender). The multiple copies are exact copies of one another, and are stored at multiple nodes in a manner that is publicly accessible and immutable to tampering. Changing the code and/or transaction records by a malicious entity without detection is difficult if not impossible, since such changes are quickly detected. Malicious tampering is reduced or prevented.

In a further implementation form of the first, second, and third aspects, the smart contract function is executed as a decentralized application.

In a further implementation form of the first, second, and third aspects, the distributed smart contact stores stored client code for transmission to the initiator client terminal for local storage of the client code in a data storage device thereof and execution of the client code by at least one respective hardware processor of the initiator client terminal, the client code storing code instructions for performing the selection of the at least one response.

In a further implementation form of the first, second, and third aspects, the system further comprises code instructions for and/or the method further comprises and/or the computer program product further comprises additional instructions for evaluating a consensus for the selected at least one response amongst the responding client terminals according to a majority vote computed according to the indications of validations receives from responding client terminals.

In a further implementation form of the first, second, and third aspects, the system further comprises code instructions for and/or the method further comprises and/or the computer program product further comprises additional instructions for computing a hash value based on an indication of each of the selected at least one response, wherein the hash value is provided to each of the corresponding responding client terminals for local computation of the hash value by the respective responding client terminal for matching to the provided hash value.

In a further implementation form of the first, second, and third aspects, the system further comprises code instructions for and/or the method further comprises and/or the computer program product further comprises additional instructions for verifying a threshold approval ratio is reached according to the indications of validation received from the corresponding responding client terminals, wherein the threshold approval ratio is included with the function message.

In a further implementation form of the first, second, and third aspects, the hash value is computed for a concatenation of a plurality strings, each string including an identification code for a respective responding client terminal and the associated unencrypted parameter.

In a further implementation form of the first, second, and third aspects, the unencrypted target value denotes a total amount of a loan, and the parameter denotes an interest rate for a partial amount of the total amount of the loan, wherein the function message denotes a tender for the total amount of the loan, and wherein each respective response denotes a bid for the partial amount of the total amount of the loan at the respective interest rate.

In a further implementation form of the first, second, and third aspects, the selecting of the at least one response is according to a lowest value of the decrypted proposed interest rate.

In a further implementation form of the first, second, and third aspects, the system further comprises code instructions for and/or the method further comprises and/or the computer program product further comprises additional instructions for receiving from the plurality of responding client terminals, funds of the at least partial amount associated with each respective bid, locking the received funds, and unlocking funds for access by the initiator client terminal, and by the non-selected responding client terminals in response to receiving the indication of the validation of the selected at least one response.

In a further implementation form of the first, second, and third aspects, the funds are provided to the smart contract function code by each of the responding client terminals that execute a transmit function of an application programming interface (API) that accesses a respective digital wallet of the plurality of responding client terminals and transmits the funds to the smart contract function code, and the unlocked funds are accessed by the initiator client terminal executing a get function of the API for obtaining the funds from the smart contract function code into a digital wallet of the initiator client terminal.

In a further implementation form of the first, second, and third aspects, the system further comprises code instructions for and/or the method further comprises and/or the computer program product further comprises additional instructions for unlocking partial funds for access by each at least one winner, wherein the partial funds denote a portion of the funds not included as the loan for the initiator client terminal.

In a further implementation form of the first, second, and third aspects, the system further comprises code instructions for and/or the method further comprises and/or the computer program product further comprises additional instructions for unlocking all funds for retrieval by the plurality of responding client terminals when a set-of-rules is met.

In a further implementation form of the first, second, and third aspects, the set-of-rules include at least one of: no selection is made, an amount of received indication of validation is below a threshold provided by the initiator client terminal, and funds are not claimed by the initiator client terminal within a defined time interval.

In a further implementation form of the first, second, and third aspects, the function message further include at least one of: a currency type of the loan, a token type of the loan, a range of the interest rate of the loan, a threshold approval ratio, and a funds holding timeout indicative of an amount of time for holding funds after elapse of the tender timeout duration.

In a further implementation form of the first, second, and third aspects, the funds of the loan are in a cryptocurrency.

In a further implementation form of the first, second, and third aspects, the system further comprises code instructions for and/or the method further comprises and/or the computer program product further comprises additional instructions for creating a new block for storage in the blockchain, wherein the new block stores, for each of the selected at least one response from corresponding responding client terminals providing the indication of validation, the address of the respective responding client terminal, the partial amount, and the unencrypted parameter, wherein the new block is stored in a data storage device accessible to a third client terminal over the network.

In a further implementation form of the first, second, and third aspects, the new block further stores all received respective response messages from the plurality of responding client terminals including respective unencrypted partial values and unencrypted parameters for access by the third client terminal.

In a further implementation form of the first, second, and third aspects, the system further comprises code instructions for and/or the method further comprises and/or the computer program product further comprises additional instructions for distributing the new block over the network to a plurality of servers hosting copies of the blockchain dataset for mining into a new block for local validation and updating respective copies of a side-chain of the block of the blockchain, wherein the side-chain stores a history of previous response messages to previous queries.

In a further implementation form of the first, second, and third aspects, the at least one response is selected in a non-centralized manner, without a third party intermediary.

In a further implementation form of the first, second, and third aspects, the response messages received from the plurality of responding client terminals are accessible to the initiator client terminal when a timeout duration provided by the initiator client terminal has expired.

In a further implementation form of the first, second, and third aspects, the response messages received from the plurality of responding client terminals are accessible to the initiator client terminal when a threshold computed as the sum of the partial values of the target value provided by the initiator client terminal is met.

In a further implementation form of the first, second, and third aspects, the function message includes an indication of a maximum parameter, and wherein the selection of the at least one response is performed according to a ranking of parameters below the maximum value.

In a further implementation form of the first, second, and third aspects, the system further comprises code instructions for and/or the method further comprises and/or the computer program product further comprises additional instructions for computing a remaining amount as a difference between the target value and the sum of the partial values, and selecting at least one additional response according to response messages including the maximum value of the parameter and the remaining amount.

In a further implementation form of the first, second, and third aspects, the system further comprises code instructions for and/or the method further comprises and/or the computer program product further comprises additional instructions for computing a remaining amount as the difference between the target value and the sum of the partial values, and selecting a plurality of additional response messages according to response messages including the maximum value of the parameter and an equal percentage of each of the partial amounts associated with the respective response messages to total the remaining amount.

In a further implementation form of the first, second, and third aspects, the equal percentage is computed based on the remaining amount divided by a sum of the partial values associated with the respective response messages.

In a further implementation form of the first, second, and third aspects, the system further comprises code instructions for and/or the method further comprises and/or the computer program product further comprises additional instructions for excluding response messages having parameters above the maximum value.

In a further implementation form of the first, second, and third aspects, each code of the respective copy of the smart contract function is executed by a copy of a virtual machine executed by the at least one hardware processor.

In a further implementation form of the first, second, and third aspects, the respective response messages received from the plurality of responding client terminals are stored in a dataset associated with the smart contract function.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3A and FIG. 3B are a dataflow diagram for resolving a tender between peers based on a copy of a smart contract function stored within a copy of a blockchain stored and managed by each of a plurality of network connected servers, in accordance with some embodiments of the present invention.

DETAILED DESCRIPTION

Figure 1:
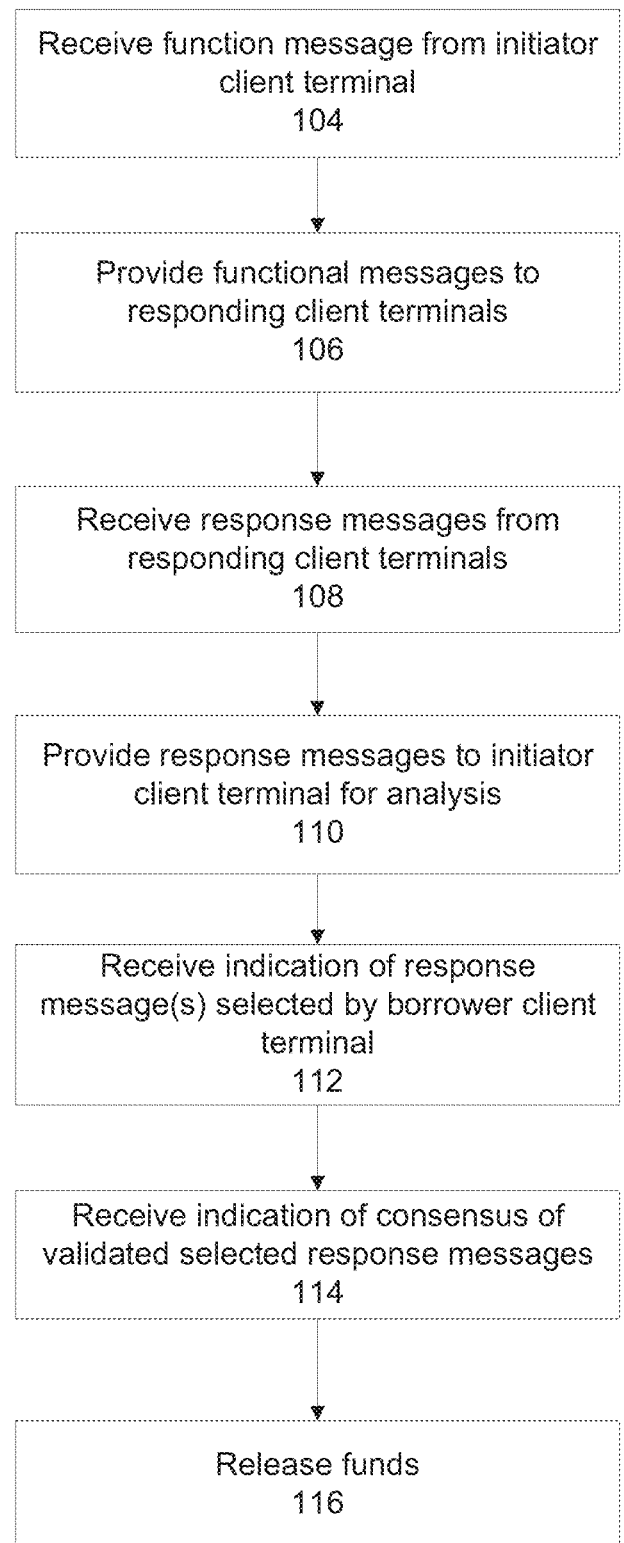
FIG. 1 is a flowchart of a method of selecting one or more response messages from multiple response messages to a function message based on a copy of a smart contract function stored within a copy of a blockchain stored and managed by each of a plurality of network connected servers, in accordance with some embodiments of the present invention.

The present invention, in some embodiments thereof, relates to a blockchain data architecture and, more specifically, but not exclusively, to a smart contract function executed within a blockchain.

An aspect of some embodiments of the present invention relates to systems, methods, and/or code instructions (stored on a data storage device, executable by hardware processor(s)) for automatically selecting one or more response messages from multiple response messages to a function message (e.g., query, update) based on a copy of a smart contract function stored within a copy of a blockchain stored and managed by each of a plurality of network connected servers. The selection of one or more response messages from multiple response messages to the function message is performed off the blockchain by client code executing on the initiator client terminal that initiated the function message. The smart contract function, also referred to herein as smart contract function, or distributed smart contract, or smart contract function code, or smart contract code, is executed as a decentralized application.

The smart contract function receives a function message that includes an unencrypted target value, for example, the function message may represent a tender for a loan, where the unencrypted target value represents the amount of the loan. The function message is received by the smart contract function code over a network from an initiator client terminal, for example, in the example of the tender for a loan, the initiator client terminal may represent a seller client terminal and/or a borrower client terminal. The function message includes a public key associated with a corresponding private key stored by the initiator client terminal. The function message is provided (e.g., made accessible) by the distributed smart contract function to multiple responding client terminals over the network. The responding client terminals may represent as bidder client terminals and/or lender client terminals in the example in which the function message represents the tender for the loan. The smart contract function receives over the network from one or more of the responding client terminals, a respective response message for at least a partial value of the total target value (e.g., partial amount of the loan). The partial value is unencrypted. The respective response message includes a parameter (e.g., proposed interest rate in the example of the tender for the loan) which is encrypted by the respective responding client terminal with the public key associated with the function message. The encryption of the parameter prevents fraud and/or malicious behavior by other responding client terminals and/or third parties who may adjust response messages based on parameters of other responding client terminals. The smart contract function stores the received response messages, and provides the response messages to the initiator client terminal when a requirement is met, for example, when a defined time has elapsed. The smart contract function receives a selection of one or more response messages (e.g., winning bids in the example of the tender for the loan) from the initiator client terminal. The initiator client terminal selects the response message(s) according to a ranking of the encrypted parameters of the respective response messages (e.g., according to lowest interest rate in the example of the tender of the loan). The sum of the unencrypted partial values of the selected response message(s) is a requirement of the target value, for example, equal to the target value, less than a maximum value greater than the target value, or above a percentage threshold of the target value (e.g., the partial loan amounts equal to the total requested loan amount, are no more than 150% of the total loan, or to a minimum percentage of the total loan that the initiator client terminal is willing to accept). The responding client terminals corresponding to the selected response message(s) transmit an indication of a validation of the respective selected response message(s) to the smart contract function code. Each of the corresponding responding client terminals is provided with all partial values (which are unencrypted) and all unencrypted parameters (which are decrypted by the initiator client terminal using the public key) associated with all of the selected response messages. For example, in the case of the tender for the loan, each lender client terminal verifies the conditions of the partial loan at the respective proposed interest rate, and may verify integrity of the selection process by analyzing the other selected unencrypted interest rates and partial loan amounts.

Optionally, the smart contract function evaluates a consensus for the selected responses amongst the responding client terminals. The consensus may be obtained according to a majority vote of the responding client terminals. The majority vote may be computed according to the indications of validations receives from responding client terminals. The majority vote may be computed according to validations received based on client terminals that accessed the function message (e.g., tender for loan), based on client terminals that provided response messages (e.g., bids) including both selected and non-selected client terminals (e.g., winners and non-winners), or based on client terminals that provided selected response messages (e.g., winning bids). The majority vote may be according to a threshold, which may be defined by the initiator client terminal (e.g., included in the function message), for example, at least 51%, at least 75%, at least 90%, or 100%.

Optionally, the smart contract function generates a block for storage in the blockchain that captures the selected response message. For example, in the example of the loan for tender, the block stores a transaction record indicative of the selected responding client terminal (s), each respective bid, each respective partial loan amount, and an indication of the initiator client terminal. The block capturing the selected response message provides a verifiable and immutable public record.

Optionally, some features are implemented by client code stored on a storage device of the initiator client terminal and/or the responding client terminal, executed by hardware processor(s) of the respective client terminals. The client code may be stored on the blockchain in association with the smart contract function code, for transmission to client terminals that register as users of the smart contract function code. For example, upon registration, the client code is downloaded to the storage device of the respective client terminal. The client code performs local computations based on data received from the smart contract function code, and transmits data to the smart contract function code, as described herein. The client code is designed to perform computations off the blockchain, by the respective client terminal, to reduce costs of executing code on the blockchain. Optionally, the client code executing on the initiator client terminal performs the selection of the response message.

At least some implementations of the systems, methods, and/or code instructions (stored on a data storage device, executable by hardware processor(s)) described here relate to the technical problem of selecting one or more response messages to a function message (e.g., resolving bids for a tender for a loan), optionally between anonymous peers, in a secure manner, without a third party intermediary. Fraud, theft, censorship, and third-part interference are prevented or reduced, to ensure safe, effective, and trust worthy selections of response messages to a function message (e.g., transactions based on resolution of the bids for the tender of the loan).

At least some implementations of the systems, methods, and/or code instructions (stored on a data storage device, executable by hardware processor(s)) described here relate to the technical problem of reducing computational costs of executing the smart contract function code in the blockchain. As described herein, some features of the smart contract function are offloaded from the smart contract function to client terminals that communicate with the smart contract function.

At least some implementations of the systems, methods, and/or code instructions described herein improve performance of a computing device and/or processor(s) that host and execute smart contract function code of the blockchain. The improvement in performance is obtained, for example, by offloading some features from the smart contract function to the client terminals that communicate with the smart contract function. The improvement in performance may be significant, for example, when a large number of initiator client terminals access the same smart contract function code stored on the same server, by offloading processor computations from the server to the initiator client terminals. For example, when a large number of response messages are selected for the functional message, each responding client terminal may independently validate the responses using its own processor, rather than performing the validation on the blockchain, which reduces the processing load off the processor hosting the blockchain.

At least some implementations of the systems, methods, and/or code instructions described herein improve performance of network connected computing nodes (e.g., servers). The improvement in performance is obtained, for example, by improved security of the selected response messages to the function message (e.g., transactions resulting from the resolution of the bids for the tender for the loan). Improved security is provided, for example, by maintenance of multiple copies of the smart contract function code that when executed automatically manages the function message and response messages (e.g., the tender for the loan), and multiple copies of the selected response message (e.g., transaction resulting from the tender). The multiple copies are exact copies of one another, and are stored at multiple nodes in a manner that is publicly accessible and immutable to tampering. Changing the code and/or transaction records by a malicious entity without detection is difficult if not impossible, since such changes are quickly detected. Malicious tampering is reduced or prevented.

When the features related to by the systems, methods, apparatus, and/or code instructions described herein are taken as a whole, the combination of the features amounts to significantly more than a simple mathematical calculation for selecting response message to a function message (e.g., selecting winners submitting bids for a tender of a loan). The systems, methods, apparatus, and/or code instructions described herein do not merely relate to the mathematical computations, but relate to the particular architecture of the system that executes the code that performs the data collection, the particular way in which the data is stored, and the particular way in which the data is provided and/or made publicly available.

At least some of the systems, methods, apparatus, and/or code instructions described herein improve an underling technical process within the technical field of distributed applications executing within smart contract functions stored in a blockchain managed by multiple network connected nodes.

At least some of the systems, methods, apparatus, and/or code instructions described herein are tied to physical real-life components, including one or more of: computational hardware at computing nodes, hardware processors that execute code instructions, data storage devices that store the blockchain and the smart contract function code, and networking equipment of the network that connects the nodes.

Accordingly, the systems and/or methods described herein are necessarily rooted in computer technology to overcome an actual technical problem in selection of response messages to a function message, over a network that connects client terminals.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described herein, one example of an implementation of selection of response message(s) from multiple response messages to a function message relates to resolution of a tender for a loan. The function message specifies the request loan amount. The response messages represent bids with partial amounts of the request loan and proposed interest rates.

Figure 2:
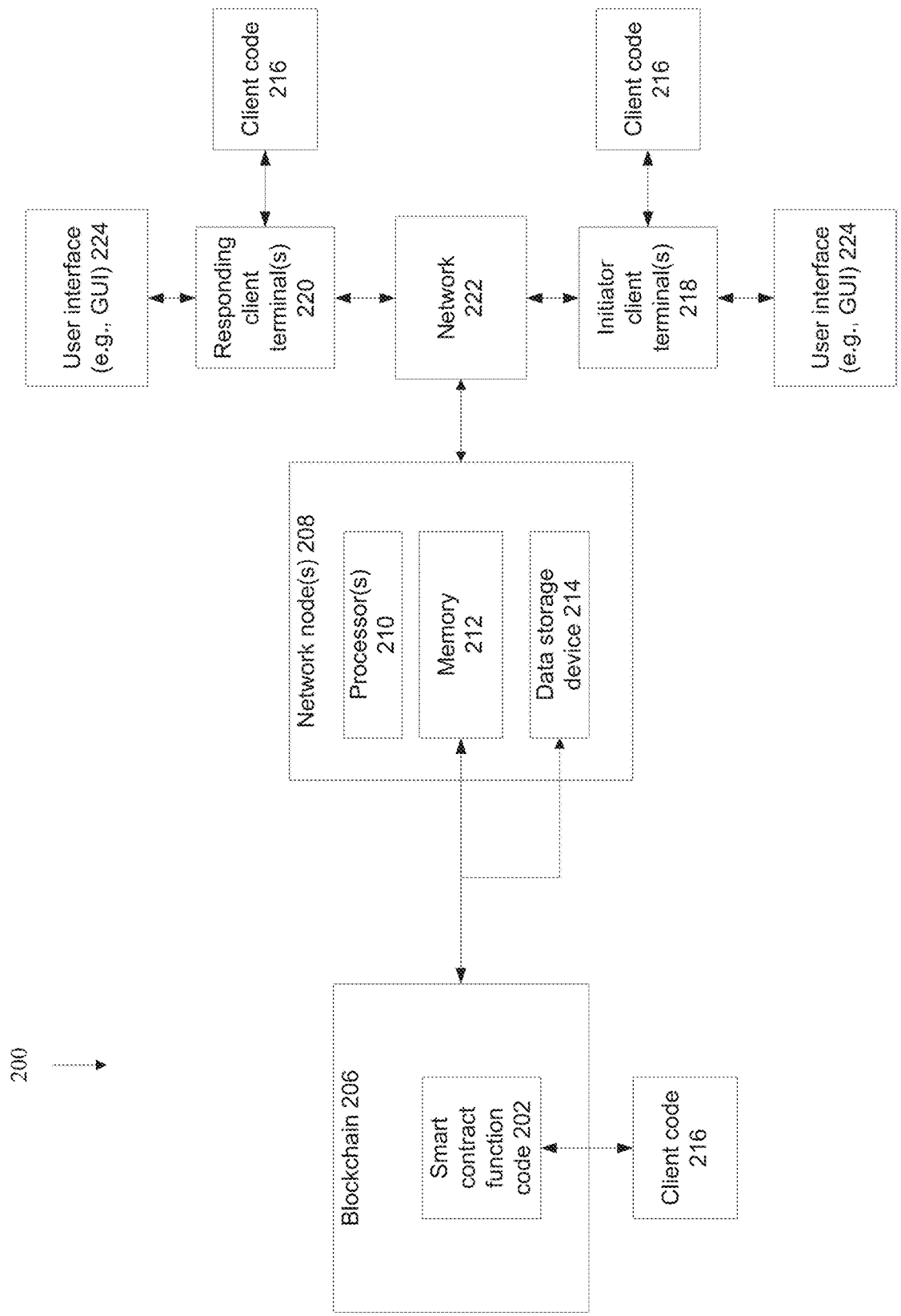
FIG. 2 is a block diagram of components of a system for selecting one or more response messages from multiple response messages to a function message based on a copy of a smart contract function code stored within a copy of a blockchain stored and managed by each of a plurality of network connected servers, in accordance with some embodiments of the present invention.

Reference is now made to FIG. 1, which is a flowchart of a method of selecting one or more response messages from multiple response messages to a function message based on a copy of a smart contract function stored within a copy of a blockchain stored and managed by each of a plurality of network connected servers, in accordance with some embodiments of the present invention. Reference is also made to FIG. 2, which is a block diagram of components of a system for selecting one or more response messages from multiple response messages to a function message based on a copy of a smart contract function code 202 stored within a copy of a blockchain 206 stored and managed by each of a plurality of network connected servers 208 (also referred to herein as network nodes), in accordance with some embodiments of the present invention.

Optionally, each code of the respective copy of the smart contract function is executed by a copy of a virtual machine executed by hardware processor(s) of each respective network connected servers.

The method described with reference to FIG. 1 and/or system 200 described with reference to FIG. 2 are for selecting response(s) from multiple response messages to a function message (e.g., selecting winners of a tender) in a non-centralized manner, without a third party intermediary.

System 200 includes multiple network nodes 208 (one node 208 shown for clarity and simplicity). Nodes 208 may be geographically distributed. Exemplary nodes 208 include, for example, a server, a computing cloud, a virtual machine, a virtual server, a client terminal, a desk top computer, a kiosk, a mobile device, a Smartphone, a Tablet computer, a laptop computer, a wearable computer, augmented reality glasses, a glasses computer, and a watch computer.

Each node 208 includes one or more hardware processors 210, for example, a central processing unit(s) (CPU), a graphics processing unit(s) (GPU), field programmable gate array(s) (FPGA), digital signal processor(s) (DSP), and application specific integrated circuit(s) (ASIC). Processor(s) 210 may include one or more processors (homogenous or heterogeneous), which may be arranged for parallel processing, as clusters and/or as one or more multi core processing units.

Each node 208 includes a memory 212 that stores code instructions executable by hardware processor(s) 210, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory stores smart contract function code 202 (also referred to as distributed smart contract code) that implements one or more features and/or acts of the method described with reference to FIG. 1 when executed by hardware processor(s) 210.

Node 208 includes a data storage device 214 for storing data, including a copy of blockchain 206 associated with smart contract function code 202. Data storage device 214 may be implemented as, for example, a memory, a local hard-drive, virtual storage, a removable storage unit, an optical disk, a storage device, and/or as a remote server and/or computing cloud (e.g., accessed using a network connection). It is noted that code may be loaded from data storage device 214 into memory 212 for execution by processor(s) 210.

Nodes 208 communicate with each other for updating their respective copies of blockchain 206.

Nodes 208 communicate with one another, with initiator client terminal 218, and with responding client terminal 220 over a network 222.

Network 222 may be implemented as, for example, the internet, a local area network, a virtual network, a wireless network, a cellular network, a local bus, a point to point link (e.g., wired), and/or combinations of the aforementioned.

Initiator client terminal 218, and/or responding client terminal 220 may be implemented as, for example, a server, a computing cloud, a virtual machine, a virtual server, a desktop computer, a kiosk, a mobile device, a Smartphone, a Tablet computer, a laptop computer, a wearable computer, augmented reality glasses, a glasses computer, and a watch computer.

Each of node(s) 208, initiator client terminal 218, and/or responding client terminal 220 may include a respective network interface for connecting to network 222, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Smart contract function code 202 is associated with client code 216, as described herein. Client code 216 may be obtained by initiator client terminal 218, and/or responding client terminal 220 from node 208, optionally by downloading via network 222. Client code 216 may be locally stored in a memory and/or data storage device of respective client terminal 218, and/or responding client terminal 220, for local execution by a hardware processor(s) of client terminal 218, and/or responding client terminal 220. Alternatively, client code 216 is stored by node 208, optionally integrated with smart contract function code 202, for remote access by initiator client terminal 218, and/or responding client terminal 220 over network 222, for example, via a web browser running on initiator client terminal 218, and/or responding client terminal 220.

Initiator client terminal 218, and/or responding client terminal 220 may access smart contract function code 202 and/or interact with smart contract function code 202, for example, by accessible software interfaces of the smart contract function code 202, for example, application programming interface (API), software development kit (SDK), and/or transmission of messages specifying certain functions for execution.

Initiator client terminal 218, and/or responding client terminal 220 include and/or are in communication with one or more physical user interfaces 224 that include a mechanism for a user to enter data (e.g., enter the target value for the function message and/or enter the partial value and/or the parameter for the response) and/or view data (e.g., view previous selection of response to queries, view unencrypted partial values and unencrypted parameters of selected response messages to the function message). User interface 224 may present a GUI that includes the mechanism for entering data and/or viewing data, for example, client code 216 and/or a web browser. Exemplary user interfaces 224 include, for example, one or more of, a touchscreen, a display, gesture activation devices, a keyboard, a mouse, and voice activated software using speakers and microphone.

At 104, smart contract function code 202 receives over network 222 from initiator client terminal 218, a function message including an unencrypted target value (e.g., tender for obtaining a loan of a defined total amount). The function message is transmitted as a network function message, for example, as a query, and/or update instructions. The target value (e.g., total loan amount) is selected by initiator client terminal 218, for example, the user enters the target value via the GUI executed by client code 216. For example, the tender is for the interest that the borrower will pay the bidder (i.e., loaner) for the loan. It is noted that the actual received amount may be different than the defined amount, optionally as defined by a requirement provided by the initiator client terminal, for example, the actual received amount may be lower or higher than the requested amount.

The instructions may be generated by initiator client terminal 218 in response to human users (e.g., via client code 216), and/or based on an automated processed executed by respective client terminals.

Initiator client terminal 218 and/or responding client terminals 220 may be identified, for example, based on account addresses, network addresses of their respective client terminals, public keys, signatures, and/or other forms of unique identification. Initiator client terminal 218 and/or responding client terminals 220 may register autonomously, based on blockchain 206 that is designed to provide reliability based on the decentralized execution of smart contract function code 216. For example, users may directly lend money to one another in an autonomous manner.

Client code 216 may be downloaded to initiator client terminal 218 and/or responding client terminals 220, for example, in response to a function message transmitted by initiator client terminal 218 to run smart contract function code 202, and/or client code 216 may have been previously installed. Executing client code 216 locally by the client terminal, rather than by node 208 which hosts blockchain 206 storing smart contract function code 202, reduces the computational costs of node 208 performing computations (e.g., increased processor utilization, increase use of data storage devices), which may incur fees. Alternatively or additionally, download of client code 216 may be declined, and/or node 208 may be designated to perform the computations of client code 216. In such a case the node 208 incurs higher computational costs for performing the computations, which may result in higher user fees paid to the node.

Features implemented by client code 216 are described herein. Client code 216 may perform functions to allow the client terminal of the user to act as a function message initiator and/or a responder (e.g., borrower and/or a bidder). Alternatively, different client codes 216 are available, depending on whether the user wants to use the client terminal for acting as a function message initiator and/or a responder (e.g., borrower and/or as a bidder).

It is noted that a single (copy of the) smart contract function code 202 may execute multiple selection processes for different initiating client terminals based on multiple datasets of responding client terminals. The same code handles all received functional messages. For example, for each function message, a different dataset of responding client terminals may be provided with the respective function message. Alternatively, the single smart contract function code 202 may act as a template, with a respective new instance of the smart contract function code 202 being dynamically created for each new received function message. Each dynamically created smart contract function code handles one received function message.

It is noted that the target value is unencrypted. The target value is publicly available to the responding client terminals and/or other third parties.

The function message includes a public key. The public key is associated with a corresponding private key that is stored by the initiator client terminal 218. The private key is not provided to the smart contract function code 202. The public key and private key may be created, for example, based on RSA(512) asymmetric cryptographic algorithm.

An Example of a Public Key:
MFwwDQYJKoZIhvcNAQEBBQAD-
SwAwSAJBAJwH/FjivWvNOKF399z5MCi
oquhMurWNbXUngavCV+
RG1RD0FsjDU3SBr269XwgFPvpkpvnEuaWtd7yRo89Q/9
UCAwEAAQ==

An Example of a Private Key:
MHBOQIBAAJBAJwH/
FjivWvNOKF399z5MCioquhMurWNbXUngavCV+RG1
RD0FsjDU3SBr269XwgFPvpkpvnEuaWtd7yRo89Q/
9UCAwEAAQJAKQE0QQu9agJ ZrMWBXxIhpN3GpG-
vduW6kcGBkhIX7YSL97LHyjT1WPsaGv6QmOtrW7Ai/
ZbOi5blg S9Ez3H9qAQMANvpWpQ4380AXw3KIBFJ-
7qmbbEqmGndk2HcJNYkkSauBAiEAtaL 4scRQsWTE+
z1i9MhGY5Bphw2a1TXfkhS9gwB6D1UCIB49d1s1VvElv+
xxgv9dnOgLa 1TIipModuvHhGkbaFYBAiBH4zJumP-
Ye33UewpLxsno5WaSKcRXnTCUqGc9Pk9a66
QIgZpzcu6VHWo5HjOK3G+WZ3EmmRRmjm8Kcn4/
my4nPQHw=

In the example in which the function message represents a tender message, may include one or more of: a currency type of the loan (i.e., a currency of a real country), a token type of the loan (e.g., a cryptocurrency), a range of the interest rate of the loan (including a defined upper limit and optionally a lower limit), a threshold approval ratio (defining the minimal percentage of the amount of the loan that the borrower is willing to accept), and a funds holding timeout indicative of an amount of time for holding funds after elapse of the tender timeout duration. The tender message may include metadata associated with the initiating client terminal, which may be manually provided by the user (e.g., via the client code) and/or automatically collected (e.g., by the client code), for example: credit rating, crowd score, month salary, and balance remaining in the electronic wallet.

The function message may be created, for example, as a record of a standard template in which values of parameters are filled according to the instructions.

At 106, the function message is provided by smart contract function code 202 over network 222 to multiple responding client terminals 220.

For example, responding client terminals may register to receive newly created queries, for example, defining a profile indication the parameters of queries they are interested in responding to. For example in the case of tenders for loans, defining the ranges of amounts of loans, currency types, token types, and interest rate ranges. In another example, the newly created queries may be published for public access, for example, presented within a web site hosted by the smart contract function code, and/or published on another web site that is available for public viewing.

The function message may be transmitted for storage and/or presentation by client code 216 executing on respective responding client terminals 220. Alternatively or additionally the functional messages are locally stored by smart contract function code 202, for example when client code 216 is not installed. In such cases the new tender may be presented to users that remotely log in to smart contract function code 202. For example, the function message may be placed in a list in an account of the user for viewing and/or selection by the user that accesses smart contract function code 202 via a web browser.

At 108, respective response messages are received from one or more of the responding client terminals 220 in response to the function message. The respective response messages may be transmitted from responding client terminal 220 when locally generated by client code 216, and/or may be locally obtained by smart contract function code 202 when users access smart contract function code 202 via a web browser.

In the example in which the function message represents a tender for a loan, the response messages represent bids.

The response messages may be created by users manually entering data, for example, into a GUI presented on respective displays of responding client terminals 220. For example, the user may manually select values and/or manually enter values into fields of parameters that correspond to the function message. Alternatively, the response messages may be automatically created by code executed by a hardware processor according to a set-of-rules.

The response messages include a partial amount of the target value of the bid (e.g., partial amount of the total amount of the loan, for example, a bid may be for $1000 of a $10000 loan). Alternatively, the response may be for the entire amount of the target value.

The partial amount of the target value provided by each respective responding client terminal is unencrypted. The unencrypted partial amounts may be accessed and/or analyzed by the smart contract function code, by other responding client terminals, and/or third parties. For example, the smart contract function code may receive the response messages, and store the response messages until a sum of the unencrypted partial amounts reaches a defined threshold of the target value (e.g., requested loan amount), for example, 80% of the target value.

Each response includes a parameter, for example, bids include a proposed interest rate for the loan. The parameter is encrypted with the public key. For example, a parameter (e.g., interest rate) of 14% is encrypted with the RSA 512 public key, for example, by calling the function RSA_512 (14, PUBLIC_KEY), which creates the result:
jEd2a3A4iS4xh/mjxVOHi2g1JdtJEgSQgZjzU08D-
4TYPMxoPunH+zc1JDummNx0Dib gZFq4NDS1f73-
qRVIIOUDw=="

In the example in which the function message represents the tender for the loan, each bid may include the actual funds of the loan and/or portion of the loan that the respective bidder will lend to the borrower if the respective bidder will win the tender. Alternatively, rather than sending the actual funds with the bid, the bid may include an indication and/or guarantee that the actual funds are immediately available. The received funds may be locked by the smart contract function code until the tender is resolved (i.e., the winners are announced) and/or the tender times out without winners, as described herein. During locking of the funds, neither the borrower nor the bidders (i.e., lenders) have access to the locked funds.

Optionally, the funds are provided to the smart contract function code by each of the responding client terminals that execute a transmit function of an application programming interface (API) that accesses a respective digital wallet of the plurality of responding client terminals and transmits the funds to the smart contract function code.

In the example in which the function message represents the tender for the loan, response messages that are not associated with funds, or do not have sufficient funds according to the respective response are excluded from further processing.

Optionally, the received response messages are stored in a dataset associated with the smart contract function code, for example, in a memory assigned to the blockchain that stores the smart contract function code, in a side chain assigned to the smart contract function code, in an external blockchain, and/or in an external data storage device. The unencrypted portions of the received response messages may be made publicly available (e.g., to any external client terminal, which may not necessarily be a responding client terminal), although it is noted that the parameters (e.g., interest rates) are encrypted and therefore not accessible to other client terminals (i.e., the key is held by the initiator client terminal) but the encrypted parameters are decrypted by the private key stored by the initiator client terminal. The encryption of the parameter (e.g., interest rates) helps ensure a fair response selection process (e.g., tender resolution process), for example, by preventing responding client terminal(s) from selecting parameters such that their response messages will be selected over response messages of other responding client terminals (e.g., proposing lower interest rates to win over other bidders that have placed earlier bids with higher interest rates).

At 110, the response messages received by smart contract function code 202 from the responding client terminals 220 are provided to the initiator client terminal 218. Initiator client terminal 218 accesses response messages stored by smart contract function code 202 over network 222. Access of the response messages by initiator client terminal 218 offloads the computations (i.e., decryption of the encrypted parameter, analyzing the response messages to the function message to select one or more response messages) from the blockchain that stores the smart contract function code to the initiator client terminal, reducing costs of computations performed on the blockchain and improving performance of the network node that hosts the blockchain by increasing available processing resources and/or memory resources. The responses may be stored locally on the blockchain by the smart contract code A notification may be generated indicating to initiator client terminal 218 that the response messages are ready for access. For example, the user may log into the smart contract function code via a web browser running on the initiator client terminal to access the response messages and locally performing computations on the initiator client terminal rather than on the blockchain, for example, to avoid fees required for execution of the analysis on the blockchain.

Optionally, the response messages are provided to the initiator client terminal when a timeout duration is met. Response messages are received from a start time until the timeout duration is met. Response messages received after the timeout duration is met are ignored and/or excluded from selection. The function message provided by the initiator client terminal may include the timeout duration, and/or the timeout duration may be a predefined setting. Exemplary timeout durations include: 1 hour, 6 hours, 24 hours, 2 days, and 1 week.

Alternatively or additionally, the response messages are provided to the initiator client terminal when a threshold of the unencrypted target value is met. The threshold may be defined by the initiator client terminal as part of the function message. For example, the threshold may be 70%, 80%, or 100% of the unencrypted target value. The smart contract function code collects the response messages until the sum of the unencrypted partial values in the received response messages is above the threshold.

An example of the response messages provided to the initiator client terminal is presented in Table 1. Each row represents a respective response. Each responding client terminal is assigned a unique ID. The partial value of the target value of the function message of each response is unencrypted. The parameter (e.g., interest rate) is encrypted by the public key associated with the function message. The column Parameter, which includes unencrypted values initiator (where the corresponding encrypted value is presented in the Encrypted Parameter), is only provided to aid in understanding and is not actually transmitted over the network and/or is not stored by the smart contract function code. The list is sorted by the initiator client terminal, optionally by the client code, for example, according to increasing interest rates. It is noted that the actual value of the parameter cannot be determined from the encrypted parameter by client terminals other than the initiator client terminal which stores the private key. Moreover, the same parameter value results in different encrypted values, for example, as can be seen by comparing the two entries for encrypted parameter corresponding to the same parameter values of 12, and the three entries for encrypted parameter corresponding to the same parameter value of 14.

TABLE 1

| ID | Parameter (shown unencrypted) | Partial value | Encrypted Parameter (as provided) |
|---|---|---|---|
| 1 | 10 | 100 | EH05lfeCMXgAu+5qvorbFvgKB0ZJaeXJmSAFOg+nBICnku8HaWtYhsgo8Q7Lz4O68KaYWHBZ+K+sxiSCcpAPtQ== |
| 2 | 12 | 200 | X+ZCo2g7u8BFZnAnVrrLC9F1Ndm3kfZHIUgXQ8L6HPL5TWooi83wn02S7YYpgtQh/M6DakjravuAToqpZ734tQ== |
| 3 | 12 | 300 | cOyKPgrPtoVUuuqJ+NyL0CQZZOCmVvy9XZh49D79lO6iV/EvOeikG5YYK09kg7voaG/GZCuixX6ZurWXiz9SBQ== |
| 4 | 14 | 300 | jEd2a3A4iS4xh/mjxVOHi2g1JdtJEgSQgZjzU08D4TYPMxoPunH+zc1JDummNx0DibgZFq4NDS1fBqRVIIOUDw== |
| 5 | 14 | 200 | ivtAYdC9YUbxbODr/kFr3+ulDW0EWXAGHxntcq2e/oP4YDdw2TjrDasELu3QtqldJswf8M9F4H/GA+dVehNutA== |
| 6 | 14 | 300 | OEiBzoajFyRWU0pp8spwiuhEn1ui3ensczBm38VLdVkf/OZ8u0hu8hkdChoi0rBA9JQyBOCWuMBLWvDPkZhilw== |
| 7 | 15 | 450 | Ptrr+2HGUrzAM9CQGVOFzrqgH4jCba/9jeo/NK9qlD9N1dTLpTGc3dbA13xw8VG3qqKqhmMpX0bl6AGl2FzZEg== |

At 112, one or more response messages are selected from the response messages provided by the responding client terminals according to the function message. The response messages are selected according to a ranking of the encrypted parameters of the respective response messages, for example, the lowest interest rates. A sum of the unencrypted partial values of the selected response(s) is according to a requirement of the target value for example, equal to the target value, less than a maximum value greater than the target value, or above a percentage threshold of the target value (For example, the sum of the partial amounts of the loan equals the total loan amount, or is above 70% (or 80% or other value) of the total loan amount, or is below 150% of the total loan amount.

An indication of the selected response messages is provided to the smart contract function, for example, transmitted by the initiator client terminal over the network.

Optionally, the analysis of the response messages and/or selection of the response messages(s) is performed by client code 216 executing on initiator client terminal 218. Such off-blockchain computations reduce costs associated with execution of computations on the blockchain, and improving performance of the network node that hosts the blockchain by increasing available processing resources and/or memory resources. A selection message indicating the selected response messages is transmitted from the initiator client terminal to the smart contact code. The selection message may include the partial amount of each respective response. Alternatively, the analysis and selection of the response messages(s) is performed by client code 216 executing on the blockchain.

The client code (executing on the initiator client terminal and/or on the blockchain) decrypts the encrypted parameters of the respective response messages using the private key stored by the initiator client terminal. It is noted that executing the client code on the initiator client terminal aids in securing the private key of the initiator client terminal, since transmission of the private key over the network to the smart contract function code hosted by the blockchain is not required. The client code may sort the response messages(s) received by the tender smart contract data according to a ranking (e.g., the lowest value(s) and/or highest values) of the decrypted parameter (e.g., proposed interest rate). The highest (or lowest) ranked response(s) may be selected.

Optionally, response messages having a parameter value above a maximum threshold (e.g., maximum interest rate) may be ignored and/or excluded from further consideration. The maximum threshold may be provided by the initiator client terminal as part of the function message and/or may be a preset configuration value. Alternatively or additionally, response messages having a parameter value below a minimal threshold are ignored and/or excluded from further consideration. The minimum threshold may be provided by the initiator client terminal as part of the function message and/or may be a preset configuration value. In the example of loans in which parameters are interest rates, the minimum and/or maximum interest rate may represent a realistic market based range of values for loans. Values outside the range defined by the maximum and minimum thresholds are excluded, which may help to reduce errors in response messages, and/or attempts at altering market values, and/or attempts at fraud, and/or attempts to trap a borrower into accepting very high interest rates, and/or illegal activity (e.g., loan shark).

Optionally, the response messages are selected according to a ranking of parameters below the maximum threshold and/or above the minimal threshold.

For example, the response messages may be selected starting from the lowest parameter value (or highest parameter value), by sequentially including additional response messages until the total target value and/or percentage of bidders is obtained. For example, for target value of 1000, there may be three selected response messages, one having a partial value of 500, another one providing a partial value of 300, and yet another providing a partial value of 200.

Optionally, a remaining value is computed as a difference between the target value and a sum of the partial values of the selected response messages that have parameters below the maximum threshold. Additional response messages(s) are selected according to parameters that are equal to the maximum threshold. Optionally, multiple additional response messages are selected having parameters at the maximum threshold, by dividing the remaining value amongst the additional response messages. The division may be in terms of equal portions and/or equal percentages. For example, when the remaining value is 500 and there are 5 response messages having parameter values at maximum threshold, each response is selected with a partial value of 100. Alternatively, in another example, when the remaining value is 500, and a sum of values offered by 4 response messages is 1000 (e.g., 500, 300, 150 and 50), the percentage is 50%. 50% of the partial amount offered by each of the 4 response messages is selected to reach the remaining value of 500 (i.e., 50% of 500=250, 50% of 300=150, 50% of 50=75, and 50% of 50=25). Alternatively, multiple additional response messages are selected having parameters at the maximum threshold, by dividing the remaining value amongst the additional response messages according to the partial value of the target value. The partial value of the target value may be larger than then target value. For example, for a tender for a loan of $1000, the partial value of the target value submitted by a certain responder may be $10000. In such a case, the remaining value is divided amongst the additional response messages according to the partial value. For example, when the remaining value is 500, and there are 2 response messages having parameter values at maximum threshold, the amount for each responder may be proportional to the partial value above the target value. When the first responder bids $10000 for the $1000 loan and the second responder bid $2000, the first responder receives 4 times of the remaining value than the second responder, i.e., $400 vs. $100.

Dividing the remaining value amongst the response messages with parameter values at the maximum threshold may reduce the reward to responding client terminals submitting parameters at the maximal threshold, for example, reducing the reward to bidders submitting maximum interest rates, which may encourage bidders to submit lower interest rates in an attempt to obtain larger loans. For example, a bidder having $1000 to lend may submit a lower amount in an effort to win the tender to lend the entire $1000 rather than submitting the maximum bid when the bidder is expected to lend only a percentage of the $1000.

Alternatively, the responses message may be randomly allocated. Response messages having parameter values at the maximum threshold may be randomly allocated.

In another example, for a function message in which the target value is 1000, and parameter (e.g., interest) range is 5%-14%, with threshold approval ratio of 2/3 or 66.67%, based on the values of Table 1, there are 6 selected response messages (e.g., winning bids) with parameter values (e.g., interest rates) below the maximum threshold of 14%. Bids with ID numbers 1, 2, and 3 win the full proposed amount, totaling 600 (i.e., 100 for ID 1+200 for ID 2+300 for ID 3).

Bids with ID numbers 4, 5, and 6, which have the same proposed maximum parameter of 14%, each win a partial amount of their propose respective amounts. The remaining amount of 400 (i.e., 1000 total requested amount−600 amount filled by bids with lower parameter) is divided amongst the bidders that proposed the maximum parameter value. ID 7 is excluded since the proposed parameter (15%) is higher than the maximum threshold (14%) of the function message. Each bidder that bid the maximum interest rate wins 50% of the respective proposed amount. The 50% value is computed as the ratio 400/800, where 400 is the remaining amount, and 800 is the total proposed amount of the bidders at maximum interest rate (i.e., 300 for ID 4+200 for ID 5+300 for ID 6). Therefore, ID 4 wins 50% of 300=150, ID 5 wins 50% of 200=100, and ID 6 wins 50% of 300=150, for a total of 150+100+150=400 remaining amount.

At 114, an indication of a validation for the selected response is received by the smart contract function code from corresponding responding client terminals. Each of the corresponding responding client terminals is provided with (e.g., able to access) all partial values and all unencrypted parameters associated with all of the selected response messages. Each responding client terminal may independently validate the selected responses using its own processor resources, rather than requesting that the processor(s) hosting the blockchain perform the validation (i.e., off blockchain), which reduces the processing load from the processor(s).

The encrypted parameters associated with the selected response message may be decrypted by the initiator client terminal using the private key. The unencrypted parameters are transmitted to the smart contract function code from the initiator client terminal. Such implementation maintains privacy of the private key, by preventing transmission of the private key over the network, and/or reduces processing by the blockchain by performing the decryption by the processor of the initiator client terminal. Alternatively or additionally, the encrypted parameters associated with the selected response message may be decrypted by the smart contract function code based on the private key received from the initiator client terminal. In such implementation, the initiator client terminal may transmit an indication of the selected responses and the private key to the smart contract function code for decryption of the encrypted parameters by the smart contract function code using the private key. Such implementation may improve the integrity of the selection process, by having the smart contract function code perform its own decryption, rather than relying on the decryption performed by the initiator client terminal.

Optionally, smart contract function code evaluates a consensus amongst the responding client terminals. The consensus may be obtained by a majority vote amongst the responding client terminals. For example, the consensus and/or majority vote is according to a threshold percentage of the total number of responding client terminals (include non-selected client terminals) that validated the selected response, and/or according to a threshold percentage of the selected client terminals, for example, at least 51%, or at least 70%, or at least 80%, or 100% of the client terminals provided validations. The threshold percentage may be a preset system configuration value and/or defined by the initiating client terminal (e.g., associated with the function message).

The smart contract function code generates a record indicative of the selected response messages (s), for example, a transaction record is generated when the function message represents a tender for a loan. The record stores details of the selection of the response messages to the function message (e.g., the transaction resulting from the tender for loan), including for example, an ID of each of the responding client terminals associated with the selected response (s) (e.g., network address and/or account numbers of the responding client terminals), partial amount of the target value associated with each selected response (e.g., lending amount), parameter associated with teach selected response (e.g., interest rate), and ID of the initiator client terminal (e.g., network address and/or account number of the initiator client terminal). Additional information may include, for example, time details of the tender, payment schedule of the loan. Optionally, the received non-selected response messages are included in the record. Storing the non-selected response messages may be used to verify the integrity of the selected response messages, for example, by third parties and/or other client terminals.

Optionally, a validation process is executed independently by respective client terminals for validation of the selection process performed by the initiator client terminal. For example, a hash value is computed based on the indication of each of the selected response messages. The hash may be computed for a concatenation of strings, where each string includes an identification code for a respective response and the associated parameter value. For example, the concatenation of strings is passed to a SHA256 hash function. In an example, the string concatenation=final rate+sum of ("|"+ ID+"|"+Win amount), shown as for example: "14\0x12890d2cce102216644c59dae5baed380d84830c\10-00000000000000000010x 12890d2cce102216644c59dae-5baed380d84830c\20000000000000000000010x12890d 2cce102216644c59dae5baed380d84830c\3000000000000-0000000010x12890d2cce10 2216644c59dae5baed380d84-830c\15000000000000000000010x12890d2cce10221664 4c59dae5baed380d84830c\10000000000000000000010x 12890d2cce102216644c59da e5baed380d84830c\ 15000000000000000000"

The hash of the above string, computed using the function SHA256 (Concatenation Value) is: "dced2ccb3eb2c2b9-714208864e55ae90009b3425dbfc73e8a169fe9bdf1caa68"

It is noted that other validation processes may be used, for example, a check that the selected responses match one another, and/or computation of a checksum.

Optionally, each of the responding client terminals corresponding to the selected response messages is provided with an indication of all of the selected response messages, the hash value, and the private key, for example, by transmission of a function message over the network from the smart contract function code to the responding client terminal of each respective selected response. Each responding client terminal (i.e., client code stored thereon) re-computes the hash based on the received indications of the selected response messages, and compares the computed hash to the received hash. The hash computation helps prevent tampering with the selected response messages. Upon successfully matching the locally computed hash with the hash computed by the smart contract function code, the responding client terminal associated with each respective selected response (e.g., the client code stored thereon) transmits the approval message to the smart contract function code.

Optionally, smart contract function code verifies that a threshold approval ratio is reached. The threshold approval ratio denotes the minimum ratio of approvals that are to be received from responding client terminals before the selection of response messages to the function message (e.g., loan transaction) is finalized. Alternatively or additionally, the threshold approval ratio denotes the minimum percentage of the target value (e.g., funds of the requested loan) that are approved by the responding client terminals. The threshold approval ratio may be defined by the initiator client terminal with the function message, and/or may be a preset parameter. When the threshold approval ratio is met, in the case of the tender for loan, the loan transaction proceeds according to the winners of the tender, by unlocking of the funds to the borrower. When the threshold approval ratio is not met, the function message (e.g., tender) is cancelled, and locked funds are returned to the bidders in the example in which the function message is for the tender of the loan. The new record may include an indication that the transaction has not been approved and/or may include an indication that the transaction has been cancelled and funds have been returned.

The new record may be distributed over the network to the network nodes for mining into a new block for local validation and updating respective copies of a blockchain that stores a history of selection of response messages to queries (e.g., transactions based on tenders). The blockchain may be a side-chain of the blockchain that hosts the smart contract function code, and/or an independent chain. Alternatively or additionally, the new record is stored by the smart contract function code in the blockchain.

The new record is stored as a publicly accessible record within a publicly accessible data storage device and/or publicly accessible data structure, that may be accessed and read by any client terminal. Storing the new record within a blockchain makes the record permanent and immutable to modification.

Optionally, at 116, the locked funds submitted by the responding client terminals with the response messages are automatically unlocked by the smart contract function code for access by the initiator client terminal, for example, when the function message represents the tender for loan. Locked funds submitted by responding client terminals which did not win the tender are unlocked for return to the respective non-winning responding client terminals.

The funds may be automatically unlocked when a trigger event is identified by the smart contract function code, for example, selection of the response messages, receiving validation of the selected response messages, and/or generation of the new record.

When some of the funds submitted by responding client terminals are selected for the loan, the portion of the funds that are being lent may be unlocked for access by the initiator client terminal, and the portion of the funds that are not being lent may be unlocked for return to the respective responding client terminal.

The funds may be automatically unlocked for retrieval by each of the responding client terminals participating in the tender (i.e., with no funds going to the initiator client terminal) when a set-of-rules is met. Exemplary set-of-rules include: no response messages are selected, a threshold approval is below a threshold approval ratio provided by the initiator client terminal, and funds are not claimed by the initiator client terminal within a defined time interval.

Optionally, the unlocked funds are stored until the initiator client terminal and/or the responding client terminals access the funds. Indications that the funds are unlocked and waiting for retrieval may be transmitted to the initiator client terminal and/or the responding client terminals, for example, the initiator client terminal and/or the responding client terminals may execute an API for obtaining the released funds from the smart contract function code for depositing into their respective electronic wallets and/or electronic accounts. The unlocked funds may be accessed by the initiator client terminal executing a get function of the API for obtaining the funds from the smart contract function code into a digital wallet of the initiator client terminal. Alternatively, the unlocked funds are automatically deposited by the smart contract function code into electronic wallets and/or electronic accounts of the initiator client terminal and/or the relevant responding client terminals via the API.

Figure 3B:
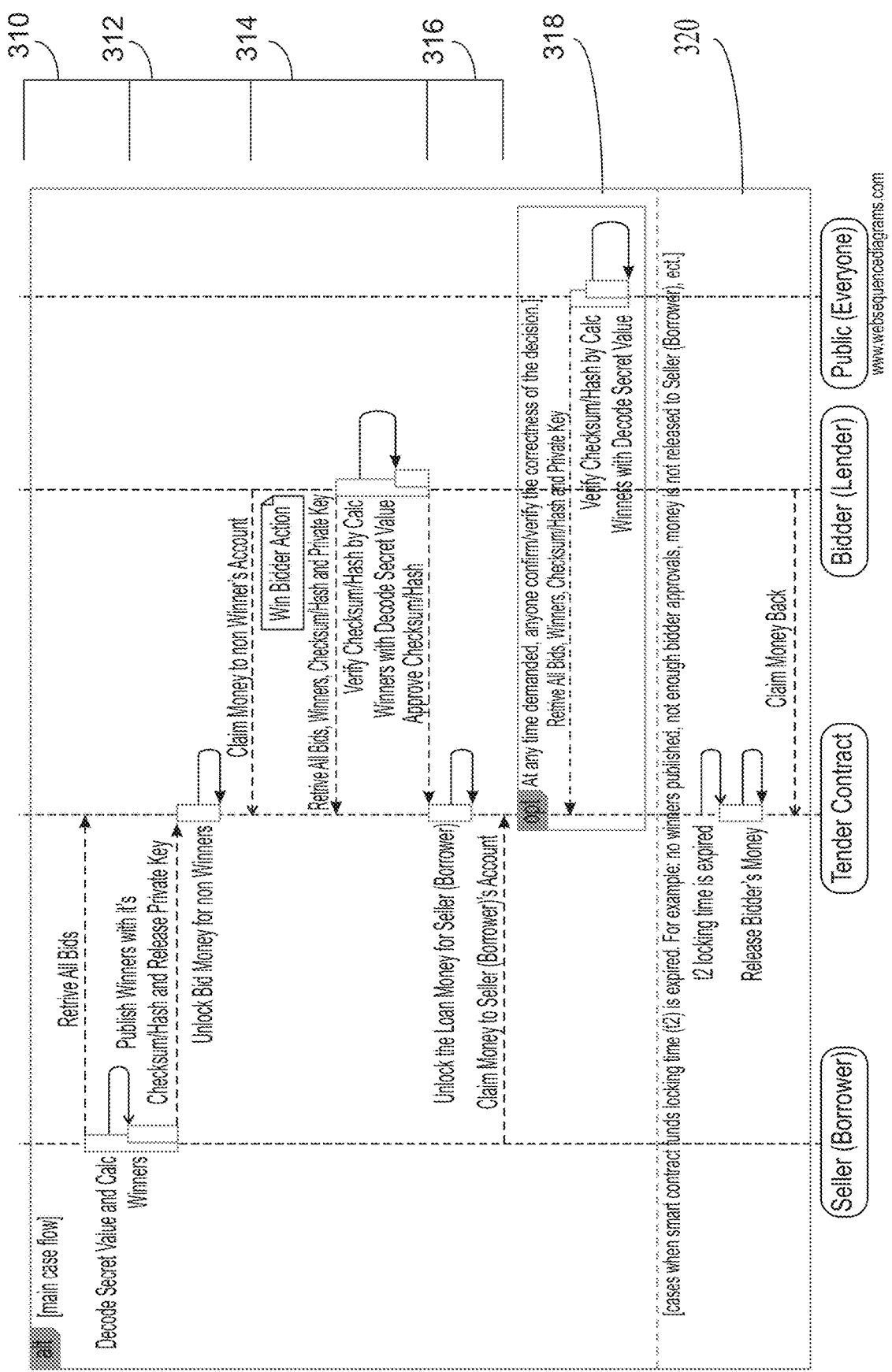

Reference is now made to FIG. 3A and FIG. 3B, which are a dataflow diagram depicting the example in which the function message represents a tender of a loan based on a copy of a smart contract function stored within a copy of a blockchain stored and managed by each of a plurality of network connected servers, in accordance with some embodiments of the present invention. The dataflow diagram described with reference to FIG. 3A and/or FIG. 3B is based at least partially on the method described with reference to FIG. 1, and/or is implemented by components of system 200 described with reference to FIG. 2.

Initiator client terminal 218, smart contract function code 202, and responding client terminal(s) 220 are as described with reference to FIGS. 1 and/or 2. Public 302 denotes a computing device with network access to smart code 202. Initiator client terminal 218 may be referred to as seller and/or borrower. Responding client terminal(s) 220 may be referred to as bidder and/or lender. Tender contract 202 may be referred to as smart contract function.

At 304, public and private keys are generated by the initiator client terminal and provided to the smart contract function for creation of a function message (i.e., tender), for example, as described with reference to act 104 of FIG. 1.

At 306, the functional message (i.e., of the tender), including a loan request and public key, is published and/or made available for access by the responding client terminals, for example, as described with reference to act 106 of FIG. 1.

At 308, the responding client terminals provide response messages (i.e., bids) to the smart contract function. Each response includes an unencrypted partial amount of money for lending and a proposed interest rate encrypted with the public key, for example, as described with reference to act 108 of FIG. 1.

Smart contract 202 stores the received response messages until a timeout value is reached.

At 310, the response messages are provided to the initiating client terminal, which decrypts the interest rate using the private key, and selects the response messages, for example, as described with reference to act 110 of FIG. 1. The response messages may be provided when the timeout value has expired. At 312, the response messages are provided to the smart contract function, for example, as described with reference to act 112 of FIG. 1.

The bid money provided in association with respective bids may be unlocked. The bidders that were not selected (i.e., non-winners) may access their funds, for example, by executing an API function for obtaining their funds and depositing the funds into their respective accounts. Alternatively, the funds may be automatically deposited back into the account of each non-selected bidder.

At 314, bidders may validate the winning bids by computing a checksum and/or hash value according to the winning bids, which include decrypted interest rates. The checksum and/or hash value computed by each bidder may be compared to the checksum and/or hash value computed by the smart contract function.

At 316, the smart contract function may evaluate a consensus of the bidders that validated the selected bids, for example, according to a majority vote, optionally a threshold value that may be greater than 51%. When the consensus is reached, the money may be unlocked and provided to the borrower. For example, as described with reference to act 114 of FIG. 1.

The record indicating the selected response messages may be created when the consensus is reached, for example, as described with reference to act 314 of FIG. 1.

At 318, a network connected client terminal (not participating in the tender, such as an external client terminal) may confirm and/or verify the tender transaction and/or the selection of the response messages according to a published selection protocol. The client terminal accesses the smart contract function to obtain the received response messages, selected response messages, network addresses of responding client terminals, checksum/hash, and/or private key. The checksum/hash may be verified by a computation performed by the external client terminal according to the selected response messages, and decoding the secret value using the private key.

Block 320 refers to examples of scenarios in which all the money of all the bidders is released, without the loan being provided to the borrower. The funds locked by the smart contract function are released, and the bidders may claim the funds. An indication that the funds have been released and are awaiting to be claimed may be transmitted from the smart contract function to each of the bidders. The money may be released, for example, when the smart contract function funds locking time expires, no response messages are selected (i.e., no winners are published), no validation consensus is obtained (e.g., no majority vote is obtained), the approval ratio is below a threshold, and/or funds are not released to the initiating client terminal.

Figure 4A:
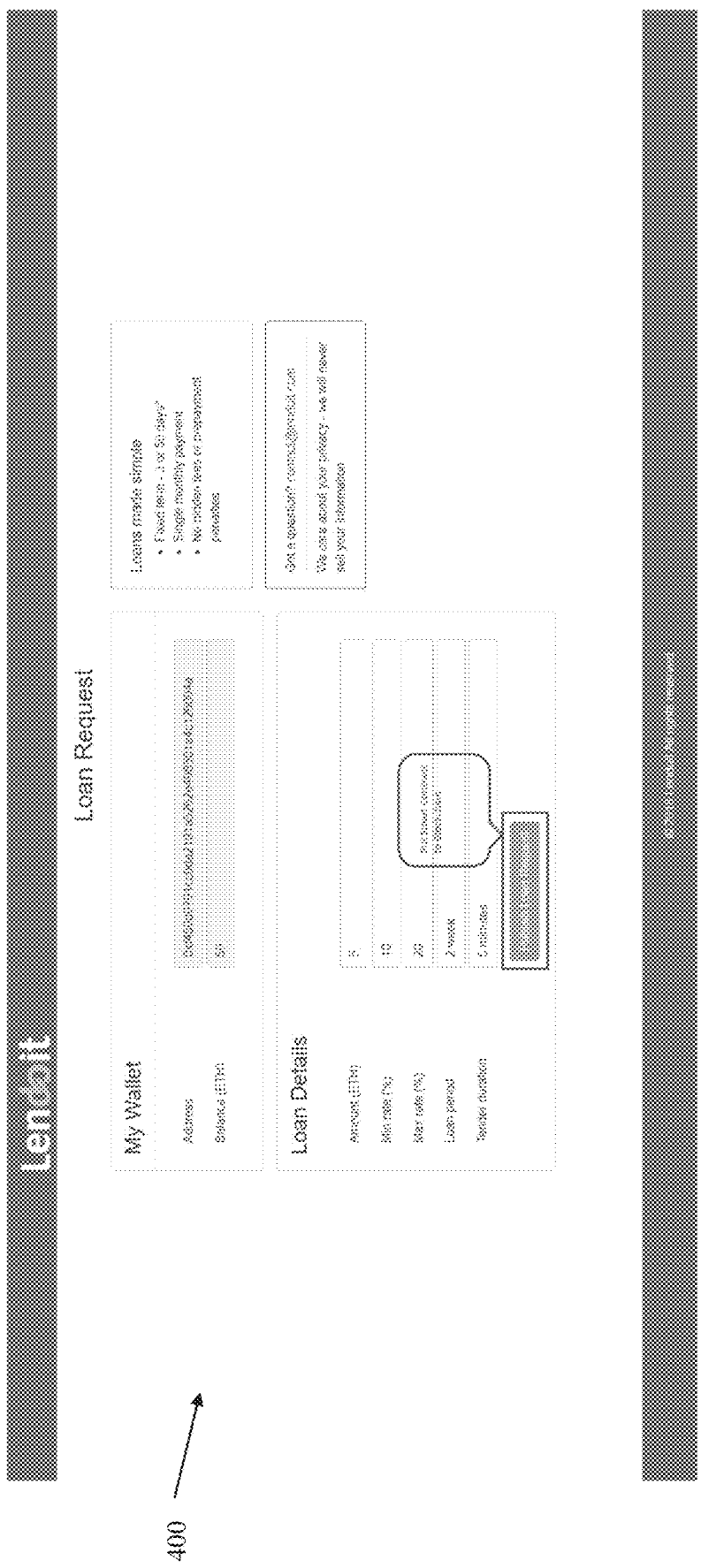
FIGS. 4A-4O depict exemplary GUIs executing on the initiator client terminal and/or the responding client terminal for selection of one or more response messages from response messages to a function message based on a distributed smart contract function of a blockchain dataset, in accordance with some embodiments of the present invention.

Reference is now made to FIGS. 4A-4O, which depict an exemplary GUI executing on the initiator client terminal and/or the responding client terminal for selection of one or more response messages from response messages to a function message based on a distributed smart contract function of a blockchain dataset, in accordance with some embodiments of the present invention. The exemplary GUIs are based on the example described herein of the function message representing a tender for a loan. The GUIs described with reference to FIGS. 4A-4O is based at least partially on the method described with reference to FIG. 1, and/or is implemented by components of system 200 described with reference to FIG. 2, and/or based on the dataflow diagram described with reference to FIG. 3A and/or FIG. 3B.

GUI 400 of FIG. 4A includes multiple fields for entering values of the function message (i.e., tender for loan) to the smart contract function. GUI 400 is presented on a display of the initiator client terminal. GUI 400 may be executed by client code running on the initiator client terminal. Exemplary fields include network address and/or account of a virtual wallet, remaining balance, requested loan amount (i.e., target value), minimum threshold (i.e., minimum interest rate), maximum threshold (i.e., maximum interest rate), loan period, and timeout tender duration, as described herein.

Figure 4B:
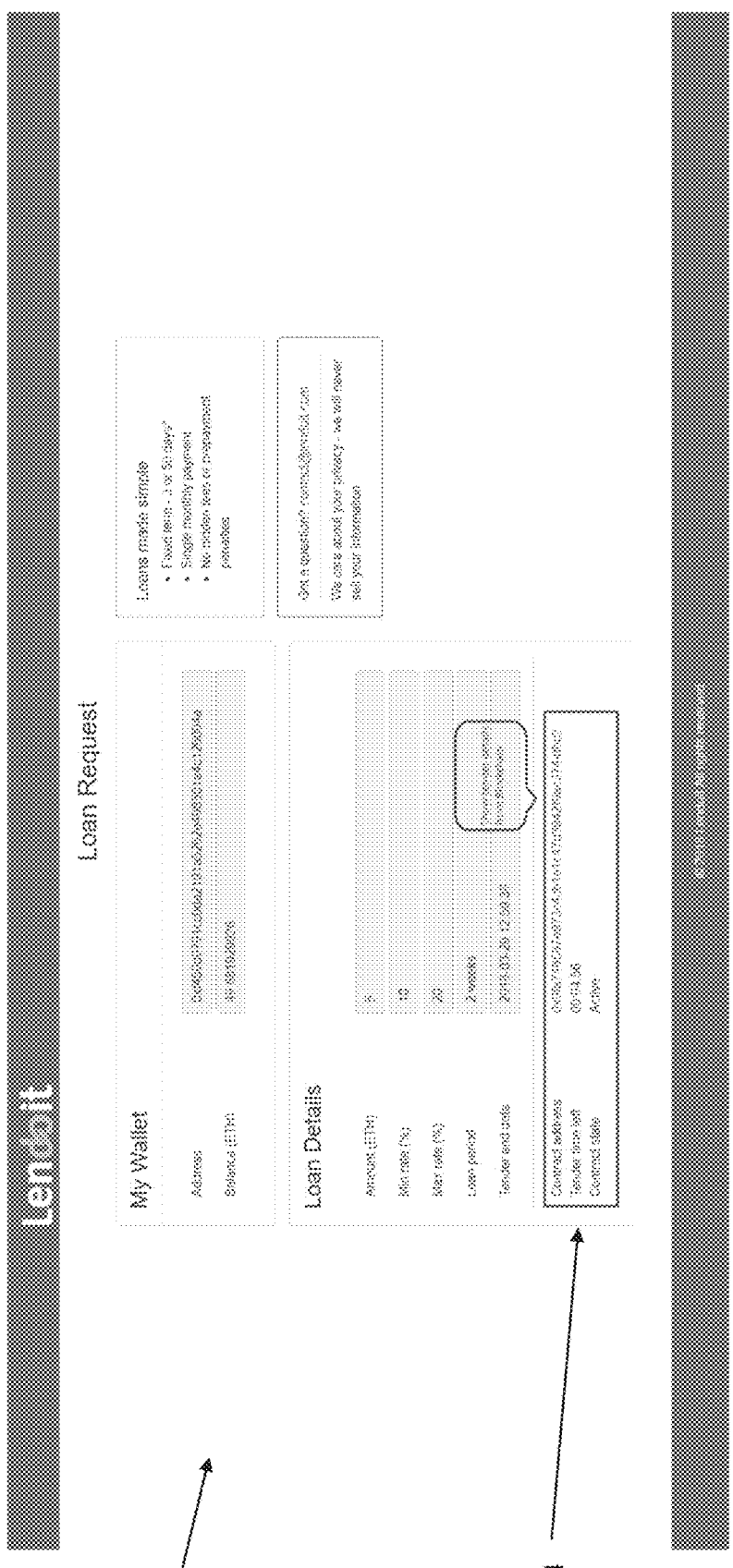

GUI 402 of FIG. 4B presents details 404 of the smart contract function executing the function message (i.e., the tender), for example, the address of the blockchain block executing the smart contract function, the remaining amount of time, and the state of the smart contract function.

Figure 4C:
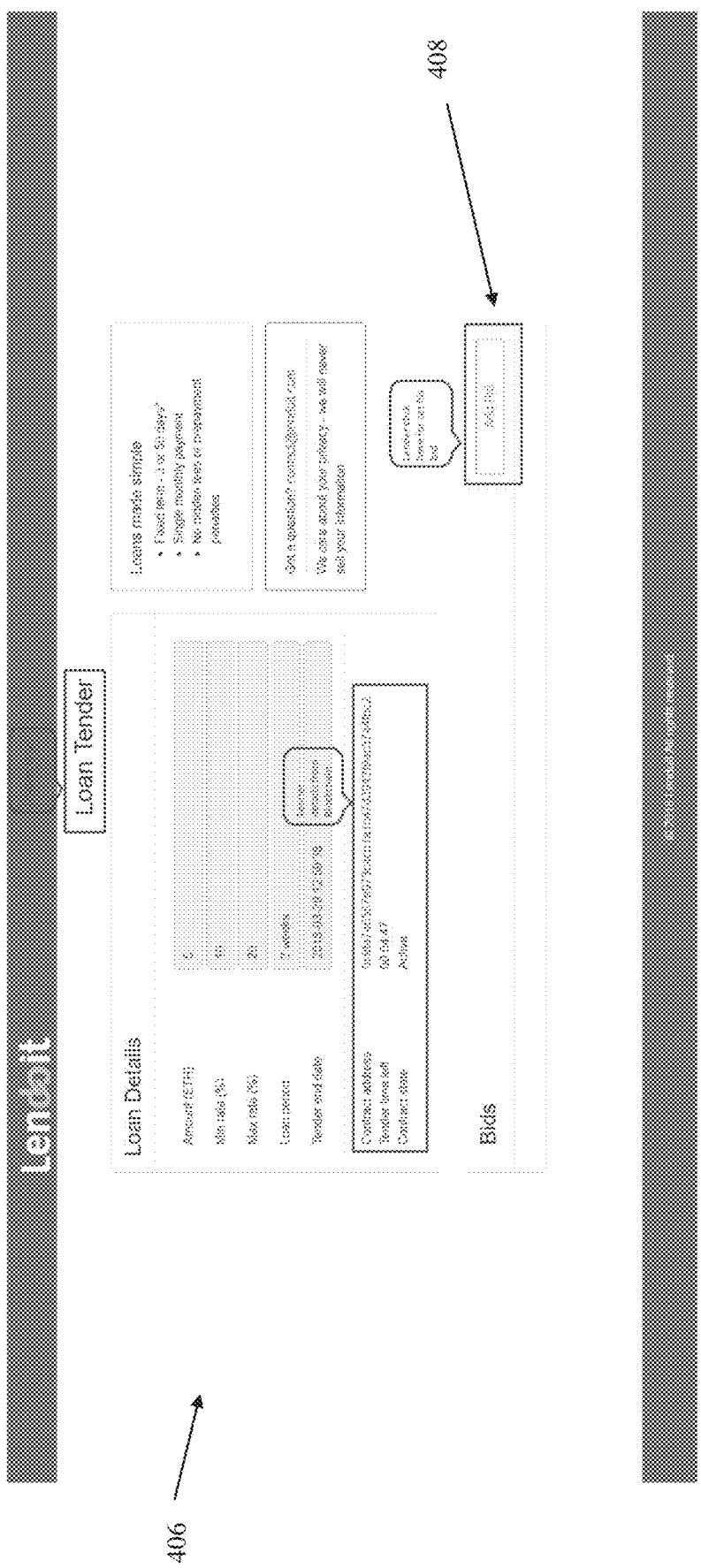

GUI 406 of FIG. 4C is presented on respective displays of each of the responding client terminals. GUI 406 presents details of the function message (i.e., tender), and includes an icon 408 for the user to submit a bid (i.e., response).

Figure 4D:
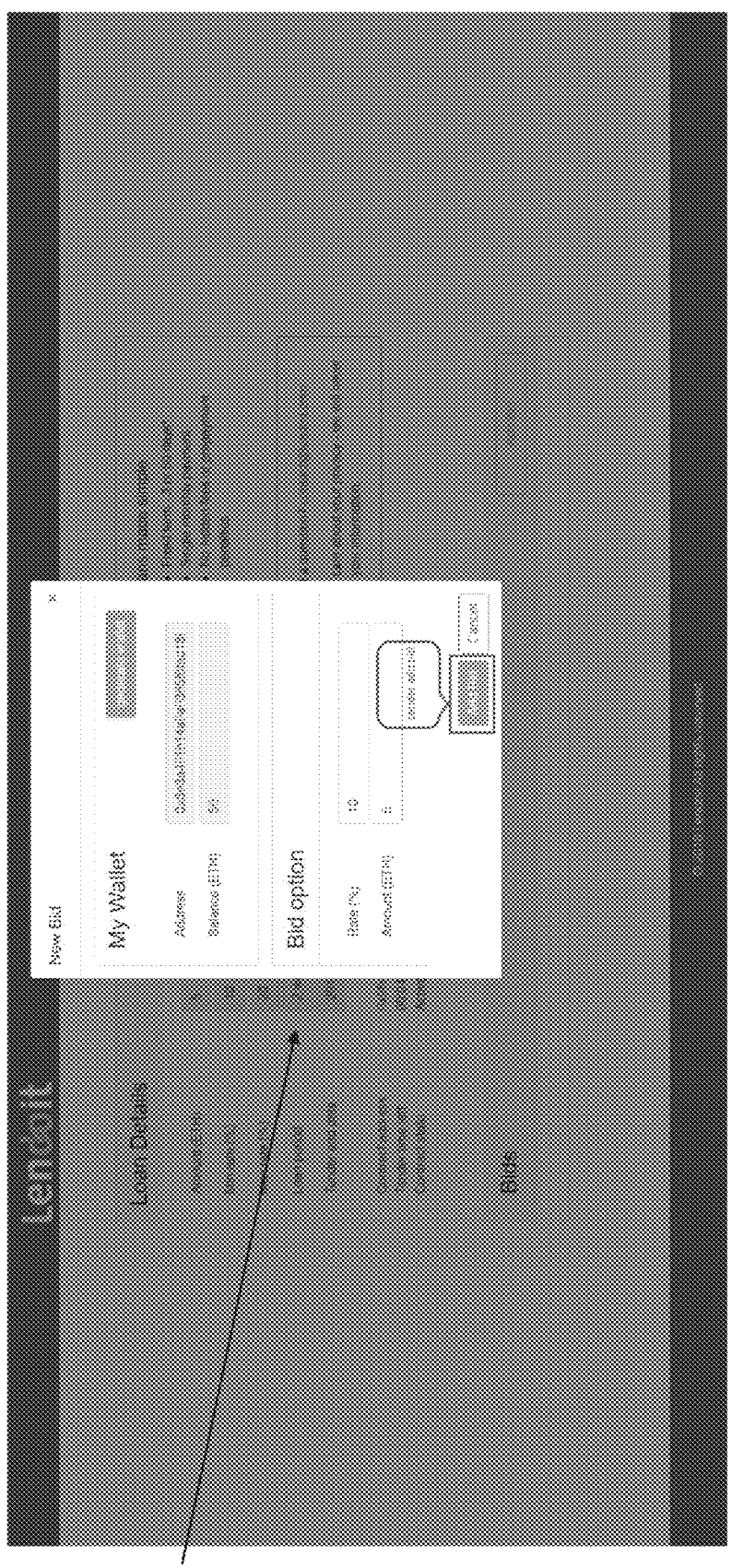

GUI 410 of FIG. 4D includes fields for the user to provide the proposed interest rate for the loan (i.e., parameter) and the partial amount of the loan (i.e., partial amount of the target value). The details of the lender's wallet may be presented, such as remaining balance and account number and/or address.

Figure 4E:
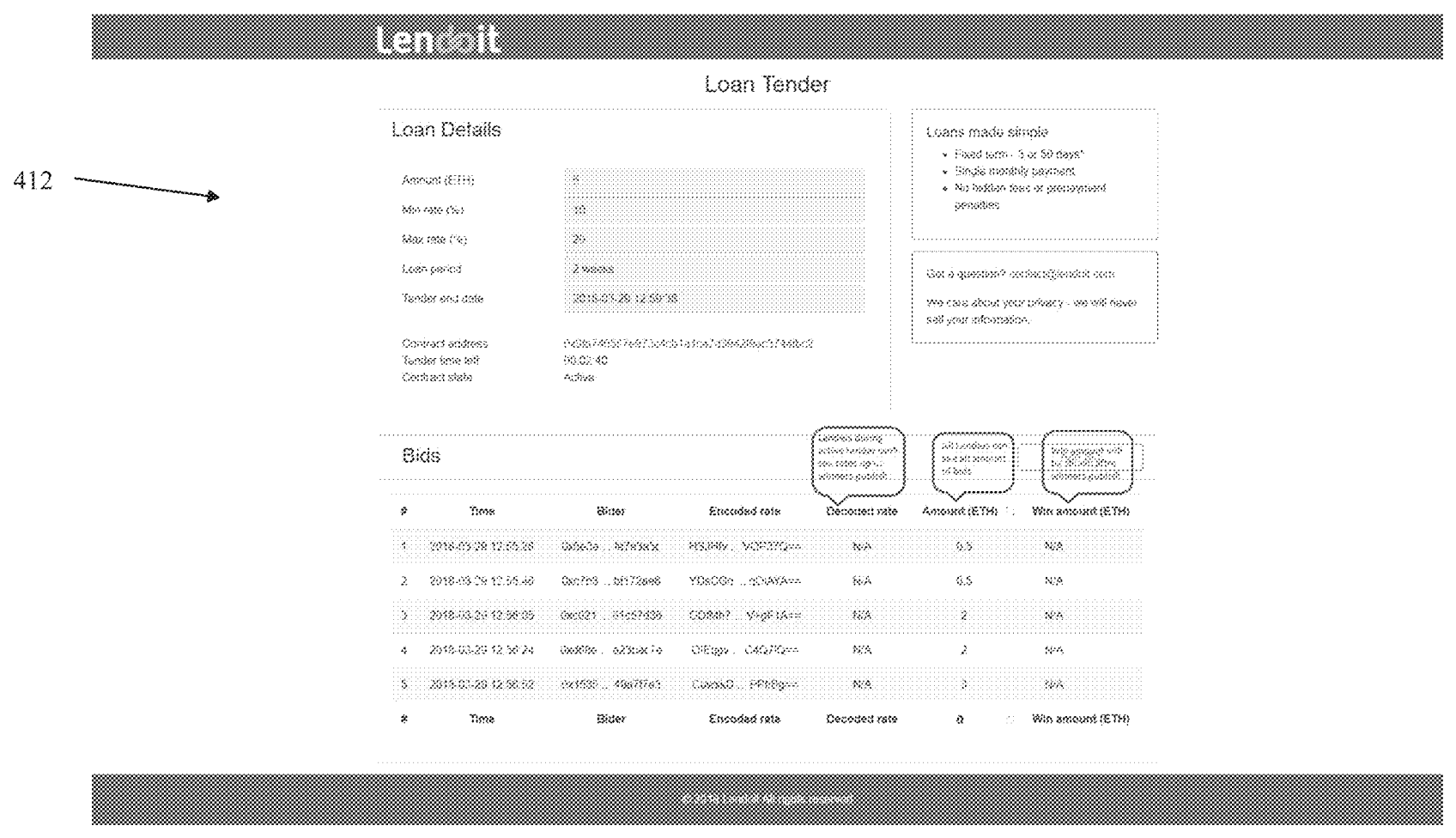

GUI 412 of FIG. 4E may be presented on the display of one or more of the responding client terminals. GUI 412 presents a summary of response messages (i.e., bids) received from the responding client terminals, including details such as an indication of the respective responding client terminal (e.g., network address), and the partial amount. It is noted that the interest rates are encrypted and therefore cannot be determined while the partial amounts are unencrypted.

Figure 4F:
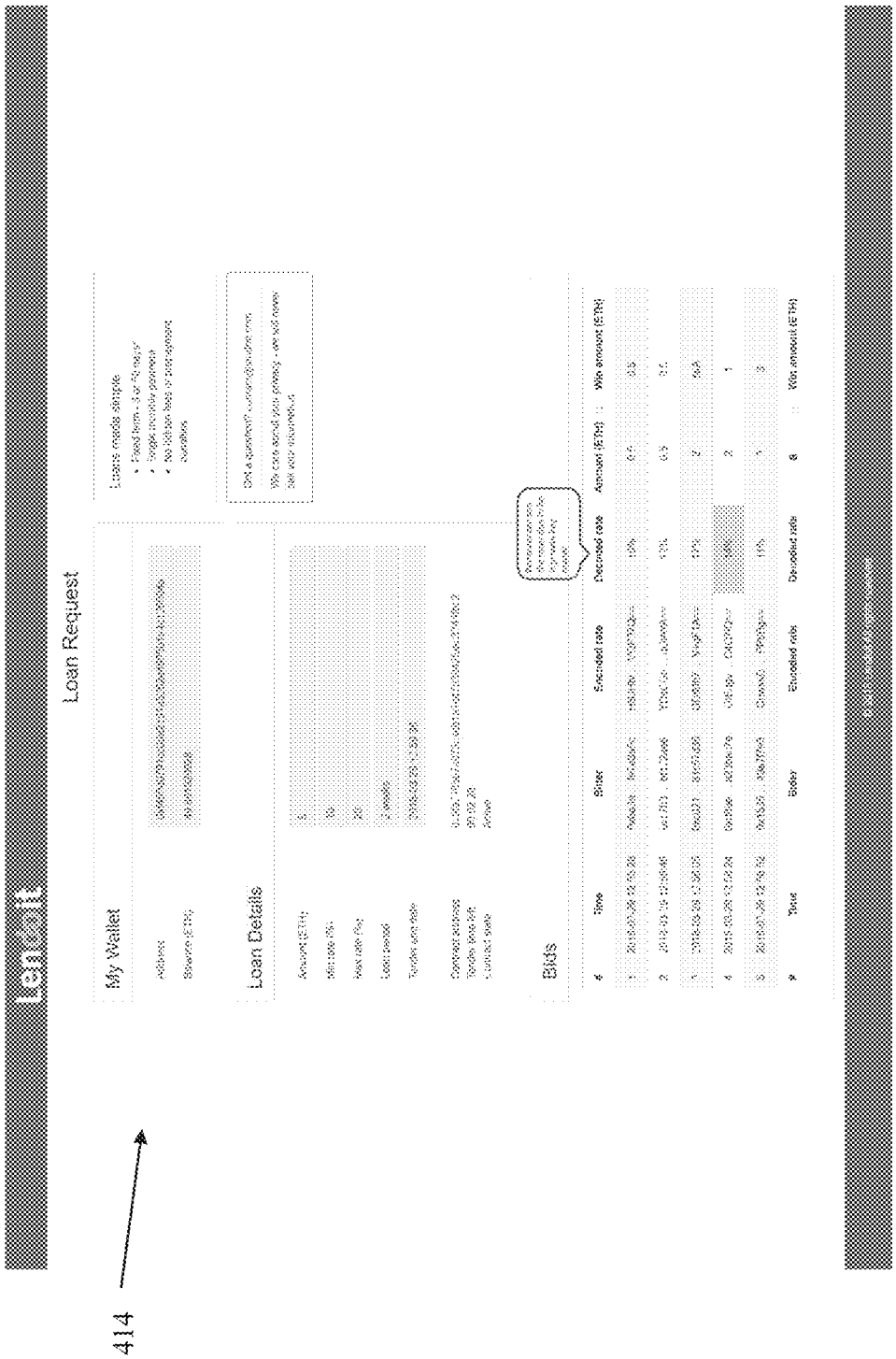

GUI 414 of FIG. 4F is presented on the display of the initiator client terminal. GUI 414 presents a summary of response messages (i.e., bids) received from the responding client terminals. It is noted that the interest rates are decrypted using the private key and are presented on the display for viewing by the user. The user may select from the response messages according to lowest interest rates, as described herein. The amount borrowed from each responding client may be equal to the partial amount of the respective response, or less than the partial amount of the respective response, as described herein.

GUI 416 of FIG. 4G may be presented on the display of one or more of the responding client terminals. GUI 416 depicts that the tender time has timed out, and the tender is now closed.

Figure 4H:
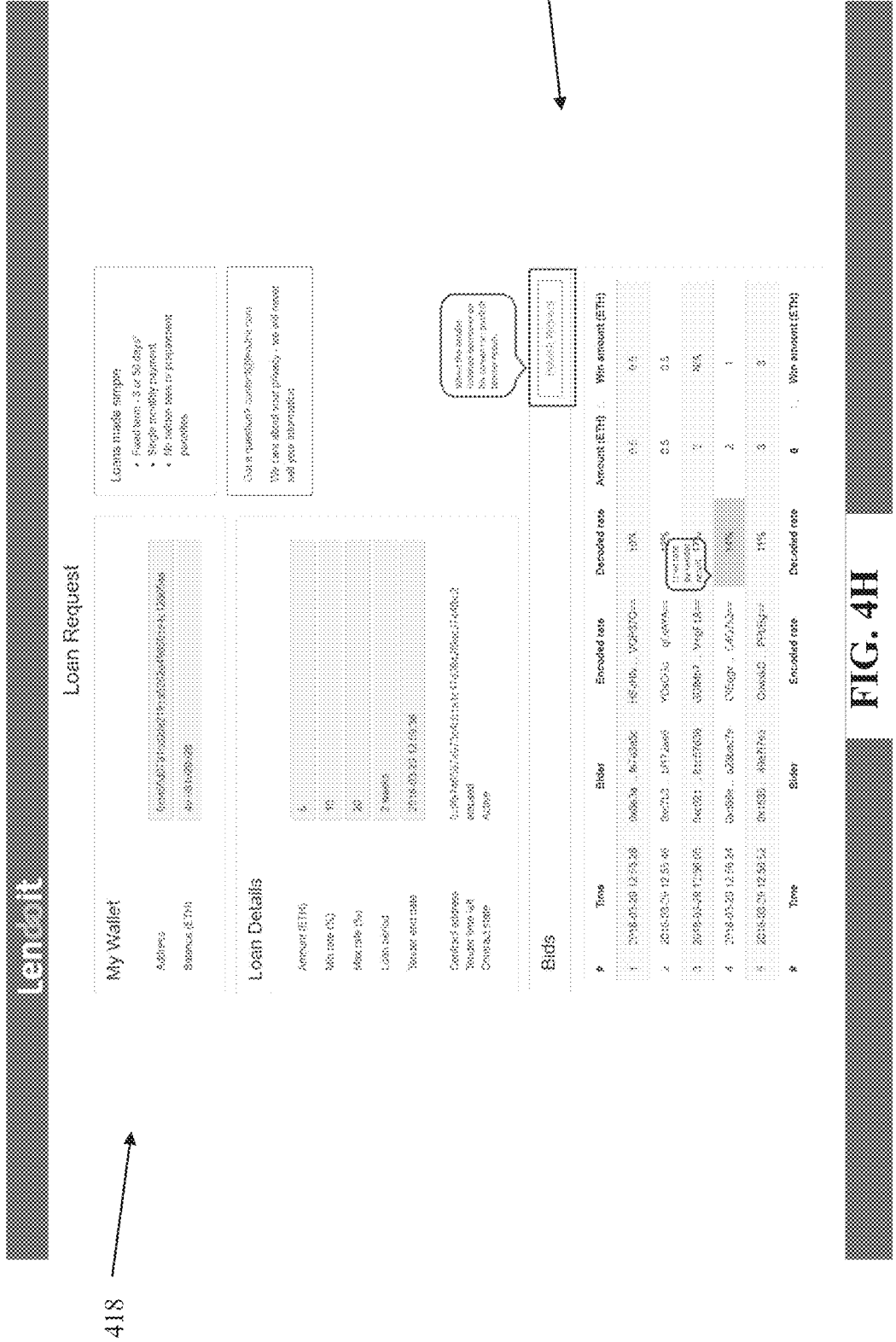

GUI 418 of FIG. 4H is based on GUI 414 of FIG. 4F and includes an icon 420 for submitting the selected response messages to the smart contract function.

Figure 4I:
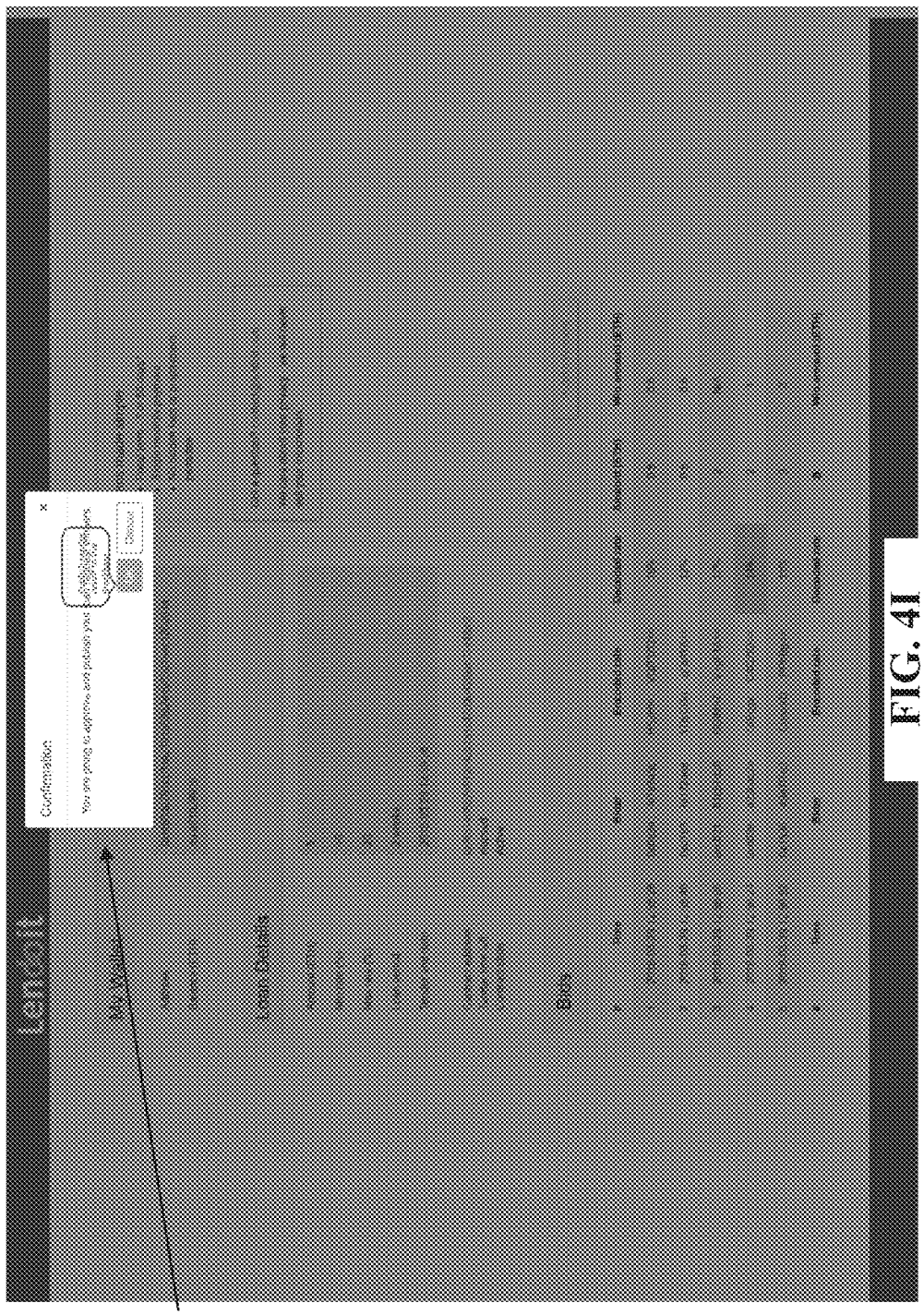

GUI 422 of FIG. 4I includes a window stating that the selected response messages are about to be submitted. The user is provided with an opportunity to cancel or proceed.

Figure 4J:
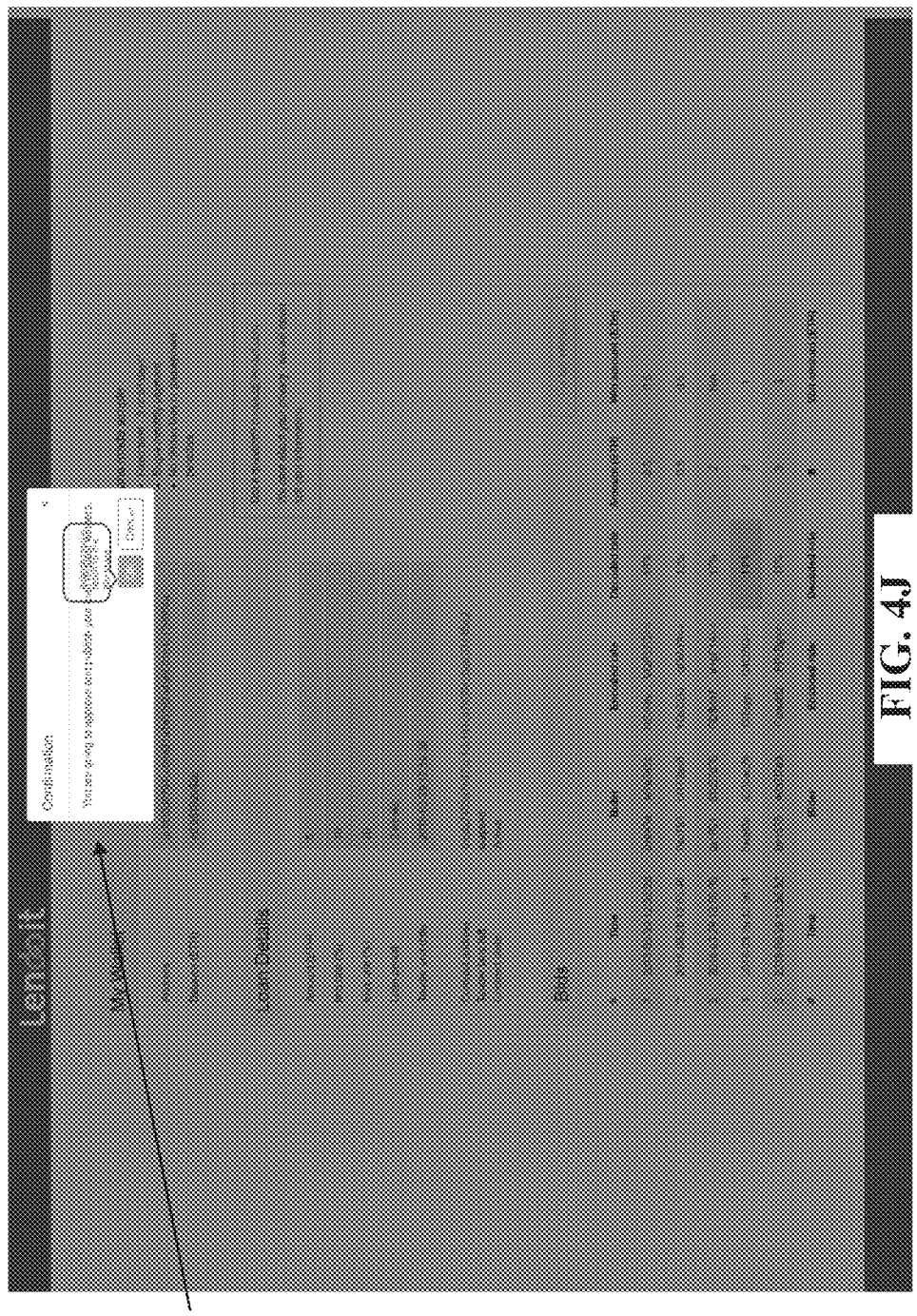

GUI 424 of FIG. 4J is based on GUI 414 of FIG. 4F and includes an indication 426 that the current state is that the smart contract function is waiting to receive validations of the selected response messages by the corresponding responding client terminals.

Figure 4K:
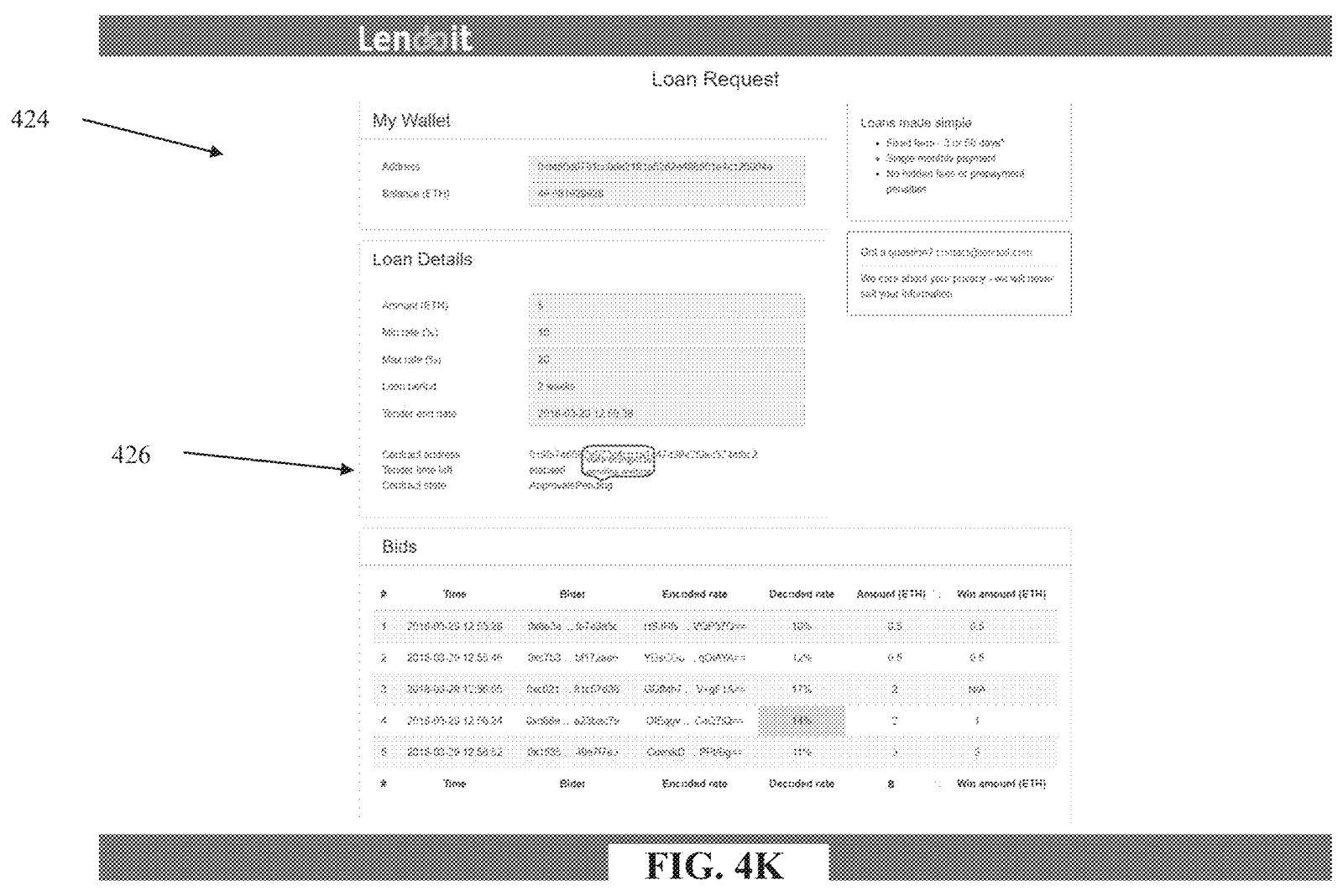

GUI 428 of FIG. 4K is presented on the display of each of the responding client terminals. GUI 428 presents to each of the responding client terminals a list of the selected response messages, where the interest rate is unencrypted. Each of the responding client terminals is able to view all of the unencrypted selected response messages. GUI 428 includes an icon 430 for approving (i.e., validating) the response submitted by the respective responding client terminal.

Figure 4L:
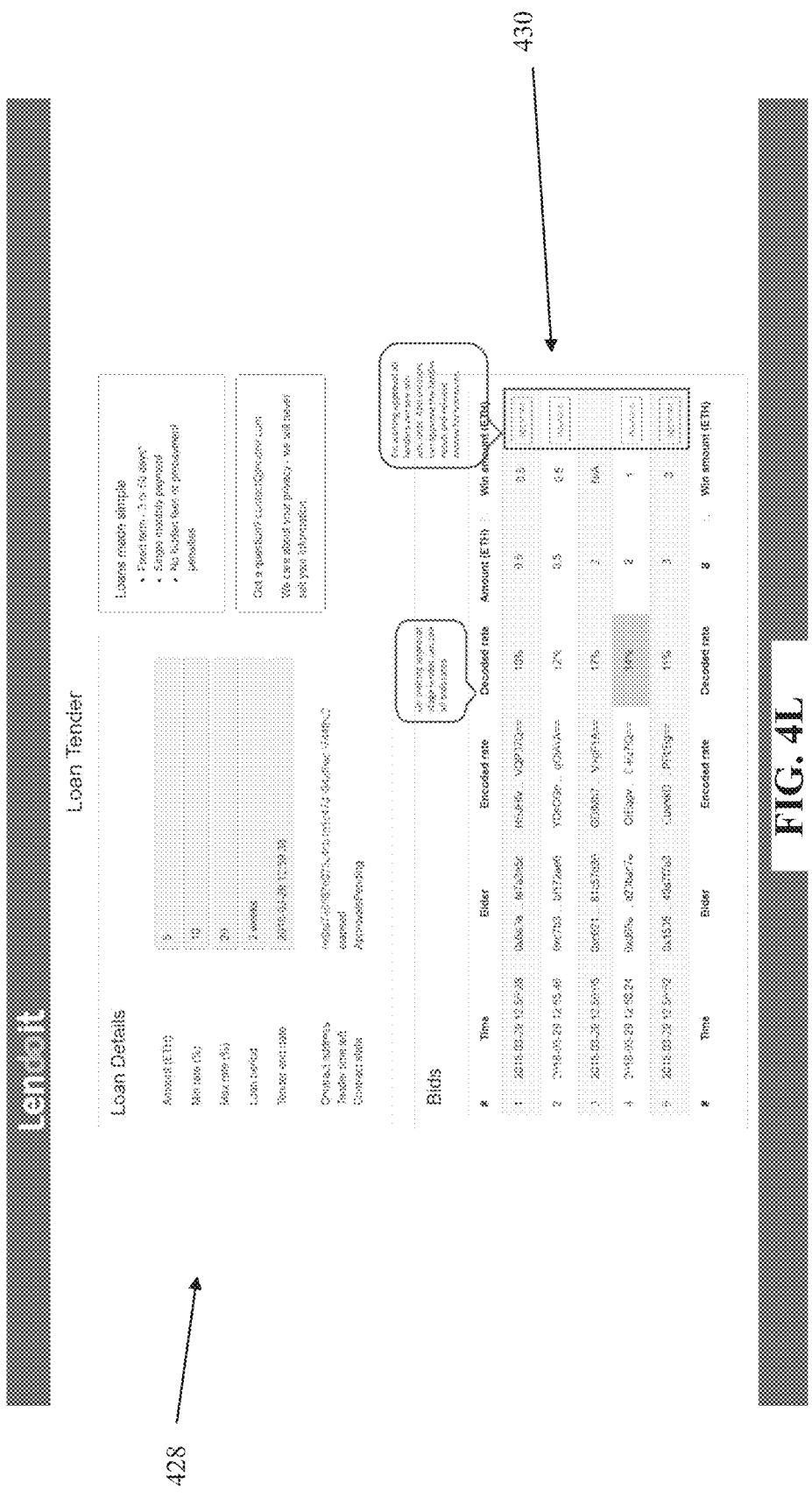

GUI 432 of FIG. 4L includes a window stating that the approval of the response is about to be submitted. The user is provided with an opportunity to cancel or proceed.

Figure 4M:
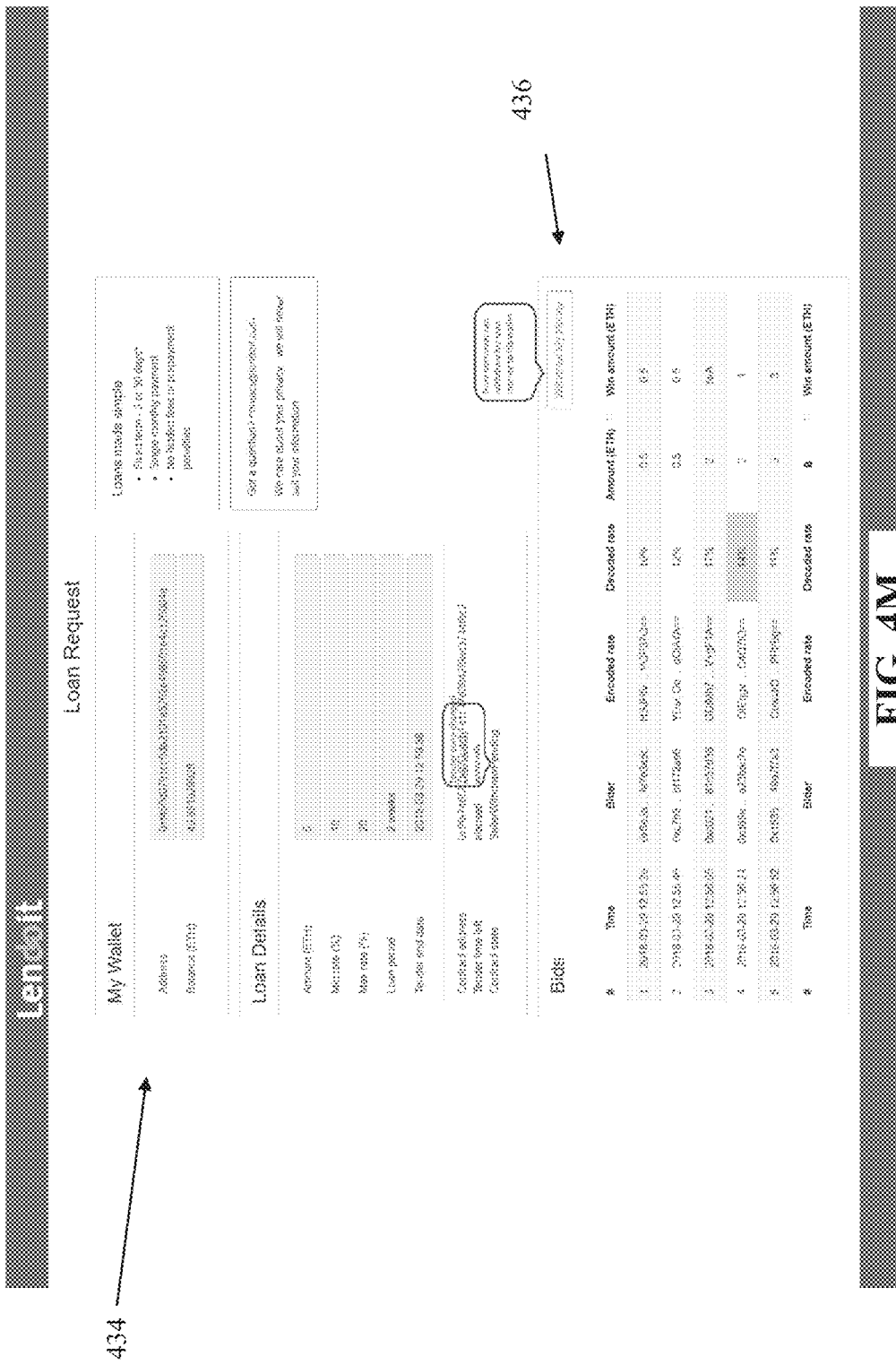

GUI 434 of FIG. 4M is presented on the display of the initiating client terminal, and includes an icon 436 to withdraw the money being borrowed via the tender. The funds may be locked by the smart contract function, and released into the electronic wallet account of the user.

Figure 4N:
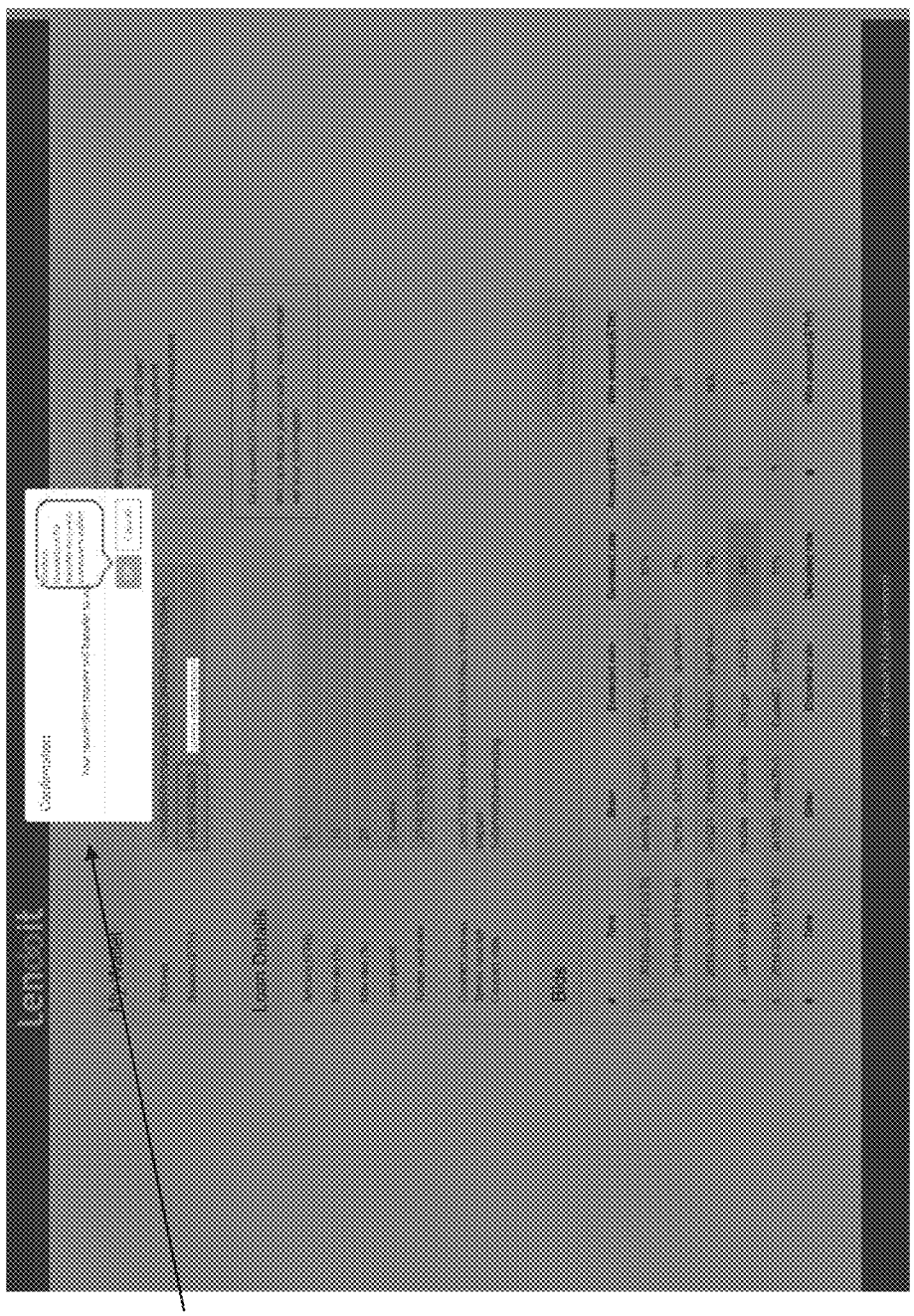
Figure 40:
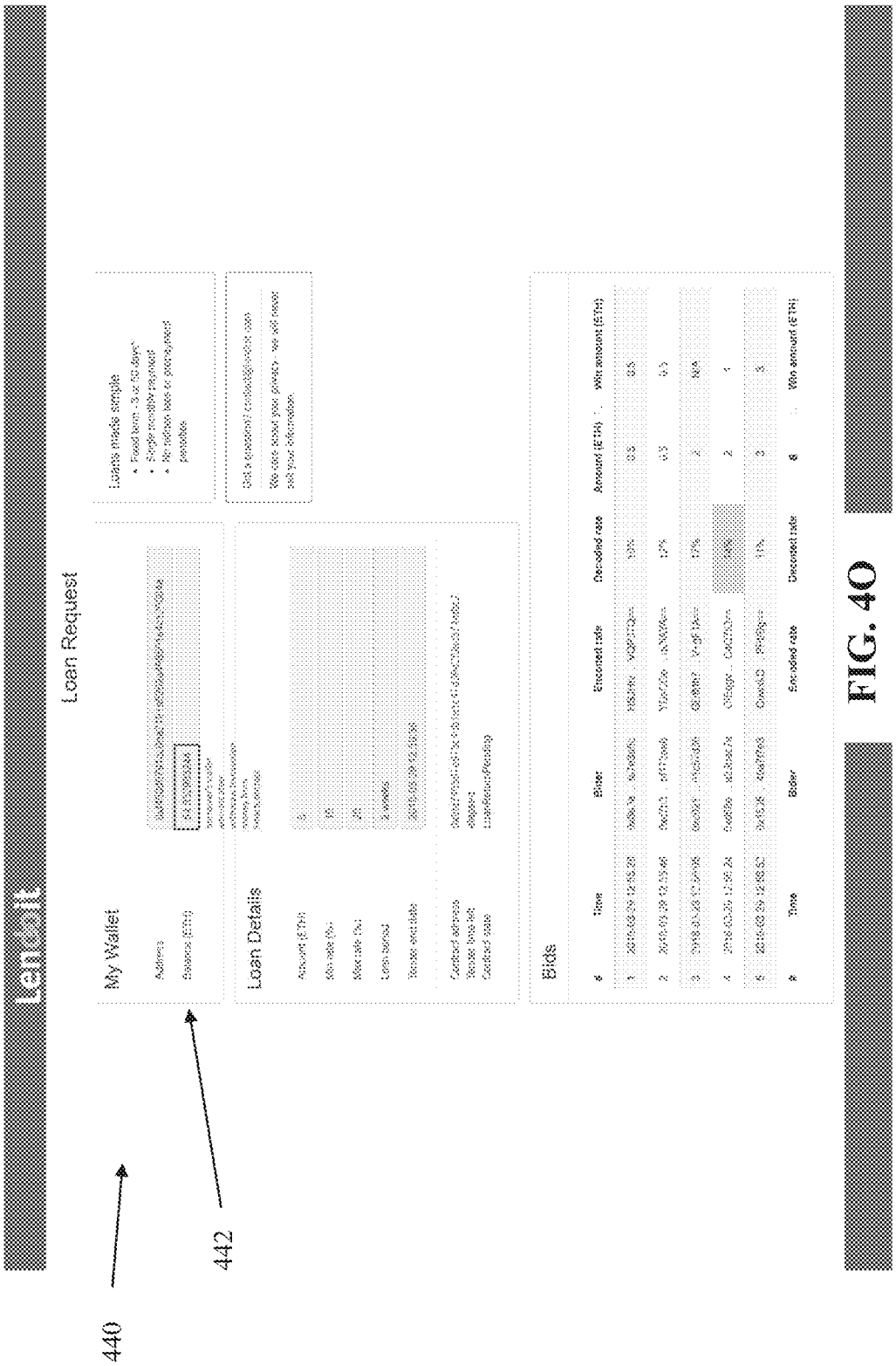

GUI 438 of FIG. 4N includes a window stating that the funds are about to be withdrawn and transferred into the electronic wallet. The user is provided with an opportunity to cancel or proceed.

GUI 440 of FIG. 4O is presented on the display of the initiating client terminal, and includes the details of the function message and resulting selected bids, as described herein. It is noted that the field 442 presenting the funds within the electronic wallet are updated based on the loan amount received by the tender.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant smart contract function architectures and/or blockchain architectures will be developed and the scope of the terms smart contract function and blockchain are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for decentralized and anonymous arrangement of a loan, using secure selection of at least one response message from a plurality of response messages including a combination of encrypted and unencrypted data processed by a distributed smart contract function of a distributed blockchain dataset, comprising:
    at least one hardware processor of a network connected server executing a code of the distributed smart contract function of the distributed blockchain dataset, wherein the distributed smart contract is executed as a decentralized application without a third party intermediary, for:
        receiving, by the distributed smart contract function, from an initiator client terminal, a function message including an unencrypted target value denoting a tender for a total amount of the loan, a threshold approval ratio defining a minimal percentage of the total amount of the loan that the initiator client terminal is willing to accept, and a public key associated with a corresponding private key stored by the initiator client terminal;
        providing the functional message by the distributed smart contract function to a plurality of responding client terminals;
        receiving respective response messages to the function message, by the distributed smart contract function, from the plurality of responding client terminals, each respective response comprising an unencrypted partial value of the target value and a parameter encrypted with the public key, the parameter denoting an interest rate for a partial amount of the total amount of the loan, each respective response denotes a bid for the partial amount of the total amount of the loan at the respective interest rate;

receiving by the distributed smart contract function from the plurality of responding client terminals, funds of the at least partial amount associated with each respective bid;

locking the funds received by the distributed smart contract function from the plurality of responding client terminal until at least one of: the tender is announced, and the tender times out without winners, wherein during the locking access to the locked funds is denied;

storing, by the distributed smart contract function, the response messages including the encrypted parameter and the unencrypted partial value received from the plurality of responding client terminals;

providing, by the distributed smart contract function, the initiator client terminal with access to the response messages including the encrypted parameter when a sum of the unencrypted partial values of the response messages is above the threshold approval ratio and/or when a timeout duration is met;

executing by client code stored on a storage device of the initiator client terminal performing computations off the blockchain using at least one hardware processor of the initiator client terminal, instructions for:

decrypting the parameter of each respective response with the private key, analyzing the respective response messages according to a ranking of the decrypted parameters of the respective response messages, and selecting the at least one response message according to the ranking of the decryption of the decrypted parameter denoting the interest rate for the partial amount of the total amount of the loan, wherein a sum of the unencrypted partial values of the selected at least one response message is according to a requirement of the target value;

receiving, by the distributed smart contract function, from the initiator client terminal, the selected at least one response message, and all decrypted parameters associated with all of the selected at least one response message that were decrypted by the initiator client terminal;

providing, by the distributed smart contract function to each of the plurality of responding client terminals that provided respective response messages to the function message, including selected responding client terminals that provided the selected at least one response message and non-selected responding client terminals that provided non-selected response messages: (i) the selected at least one response message, (ii) all decrypted parameters associated with all of the selected at least one response message that were decrypted by the initiator client terminal, and (iii) all unencrypted partial values of the target value provided in respective response messages to the function message from the plurality of responding client terminals;

independently validating, by a respective processor executing client code locally stored on each of the responding client terminals including the selected responding client terminals and the non-selected responding client terminals, the selected at least one response according to the received (i), (ii), and (iii);

receiving, by the distributed smart contract function, a respective indication of the respective validation for the selected at least one response message from at least some of the responding client terminals including the selected responding client terminals and the non-selected responding client terminals;

in response to the received indication of validation of the selected at least one response message from the at least some of the responding client terminals including the selected responding client terminals and the non-selected responding client terminals, evaluating a consensus for the selected at least one response message amongst the responding client terminals by the distributed smart contract function according to a majority vote percentage computed as a number of indications of validations received from the at least some of the responding client terminals including the selected responding client terminals and the non-selected responding client terminals relative to a total number of responding client terminals that were provided (i), (ii), and (iii), and in response to the majority vote percentage being above a majority vote threshold, unlocking the locked funds by the distributed smart contract function for access by the initiator client terminal to receive the tender for the loan, and access by the non-selected responding client terminals for return of the non-selected tender, and creating, by the distributed smart contract function, a new block for storage in the blockchain, wherein the new block stores, for each of the selected at least one response messages from corresponding responding client terminals providing the indication of validation, the address of the respective responding client terminal, the partial amount, and the unencrypted parameter, wherein the new block is stored in a data storage device accessible to a third client terminal over the network.

2. The system of claim 1, wherein the client code is stored on the non-transitory memory in association with the blockchain dataset and the code of the distributed smart contract function for transmission to the initiator client terminal and to the corresponding responding client terminals for local storage of the client code in a data storage device thereof and execution of the client code by at least one respective hardware processor of the initiator client terminal and of the corresponding responding client terminals.

3. The system of claim 1, further comprising:
computing a hash value based on an indication of each of the selected at least one response, wherein the hash value is provided to each of the corresponding responding client terminals for local computation of the hash value by the respective responding client terminal for matching to the provided hash value.

4. The system of claim 3, wherein the hash value is computed for a concatenation of a plurality strings, each string including an identification code for a respective responding client terminal and the associated unencrypted parameter.

5. The system of claim 1, wherein the funds are provided to the smart contract function code by each of the responding client terminals that execute a transmit function of an application programming interface (API) that accesses a respective digital wallet of the plurality of responding client terminals and transmits the funds to the smart contract function code, and the unlocked funds are accessed by the initiator client terminal executing a get function of the API for obtaining the funds from the smart contract function code into a digital wallet of the initiator client terminal.

6. The system of claim 1, further comprising unlocking partial funds for access by each at least one selected responding client terminals, wherein the partial funds denote a portion of the funds not included as the loan for the initiator client terminal.

7. The system of claim 1, further comprising unlocking all funds for retrieval by the plurality of responding client terminals when a set-of-rules is met.

8. The system of claim 7, wherein the set-of-rules include at least one of: no selection is made, an amount of received indication of validation is below a threshold provided by the initiator client terminal, and funds are not claimed by the initiator client terminal within a defined time interval.

9. The system of claim 1, wherein the function message further includes at least one of: a currency type of the loan, a token type of the loan, a range of the interest rate of the loan, and a funds holding timeout indicative of an amount of time for holding funds after elapse of the tender timeout duration.

10. The system of claim 1, wherein the funds of the loan are in a cryptocurrency.

11. The system of claim 1, wherein the new block further stores all received respective response messages from the plurality of responding client terminals including respective unencrypted partial values and unencrypted parameters for access by the third client terminal.

12. The system of claim 1, further comprising distributing the new block over the network to a plurality of servers hosting copies of the blockchain dataset for mining into a new block for local validation and updating respective copies of a side-chain of the block of the blockchain, wherein the sidechain stores a history of previous response messages to previous queries.

13. The system of claim 1, wherein the response messages received from the plurality of responding client terminals are accessible to the initiator client terminal when a timeout duration provided by the initiator client terminal has expired.

14. The system of claim 1, wherein the function message includes an indication of a maximum parameter, and wherein the selection of the at least one response is performed according to a ranking of parameters below the maximum value.

15. The system of claim 14, further comprising computing a remaining amount as a difference between the target value and the sum of the partial values, and selecting at least one additional response according to response messages including the maximum value of the parameter and the remaining amount.

16. The system of claim 14, further comprising computing a remaining amount as the difference between the target value and the sum of the partial values, and selecting a plurality of additional response messages according to response messages including the maximum value of the parameter and an equal percentage of each of the partial amounts associated with the respective response messages to total the remaining amount.

17. The system of claim 16, wherein the equal percentage is computed based on the remaining amount divided by a sum of the partial values associated with the respective response messages.

18. The system of claim 1, wherein each code of the respective copy of the smart contract function is executed by a copy of a virtual machine executed by the at least one hardware processor.

19. The system of claim 1, wherein the respective response messages received from the plurality of responding client terminals are stored in a dataset associated with the smart contract function.

20. The system of claim 1, wherein the distributed smart contract function collects and stores the response messages until the sum of the unencrypted partial values of the response messages reaches and/or is above the threshold, wherein the threshold is set as a requirement of the unencrypted target value provided by the initiator client terminal.

21. The system of claim 1, wherein the parameter is encrypted with non-deterministic encryption.

22. A method of decentralized and anonymous arrangement of a loan, using secure selection of at least one response message from a plurality of response messages including a combination of encrypted and unencrypted data processed by a distributed smart contract function of a distributed blockchain dataset executed by at least one hardware processor of a network connected server, wherein the distributed smart contract is executed as a decentralized application without a third party intermediary, the method comprising:
receiving, by the distributed smart contract function, from an initiator client terminal, a function message including an unencrypted target value denoting a tender for a total amount of the loan, a threshold approval ratio defining a minimal percentage of the total amount of the loan that the initiator client terminal is willing to accept, and a public key associated with a corresponding private key stored by the initiator client terminal;
providing the functional message by the distributed smart contract function to a plurality of responding client terminals;
receiving respective response messages to the function message, by the distributed smart contract function, from the plurality of responding client terminals, each respective response comprising an unencrypted partial value of the target value and a parameter encrypted with the public key, the parameter denoting an interest rate for a partial amount of the total amount of the loan, each respective response denotes a bid for the partial amount of the total amount of the loan at the respective interest rate;
receiving by the distributed smart contract function from the plurality of responding client terminals, funds of the at least partial amount associated with each respective bid;
locking the funds received by the distributed smart contract function from the plurality of responding client terminal until at least one of: the tender is announced, and the tender times out without winners, wherein during the locking access to the locked funds is denied;
storing, by the distributed smart contract function, the response messages including the encrypted parameter and the unencrypted partial value received from the plurality of responding client terminals;
providing, by the distributed smart contract function, the initiator client terminal with access to the response messages including the encrypted parameter when a sum of the unencrypted partial values of the response messages is above the threshold approval ratio and/or when a timeout duration is met;
executing by client code stored on a storage device of the initiator client terminal performing computations off the blockchain using at least one hardware processor of the initiator client terminal, instructions for:

decrypting the parameter of each respective response with the private key, analyzing the respective response messages according to a ranking of the decrypted parameters of the respective response messages, and selecting the at least one response message according to the ranking of the decryption of the decrypted parameter denoting the interest rate for the partial amount of the total amount of the loan, wherein a sum of the unencrypted partial values of the selected at least one response message is according to a requirement of the target value;

receiving, by the distributed smart contract function, from the initiator client terminal, the selected at least one response message, and all decrypted parameters associated with all of the selected at least one response message that were decrypted by the initiator client terminal;

providing, by the distributed smart contract function to each of the plurality of responding client terminals that provided respective response messages to the function message, including selected responding client terminals that provided the selected at least one response message and non-selected responding client terminals that provided non-selected response messages: (i) the selected at least one response message, (ii) all decrypted parameters associated with all of the selected at least one response message that were decrypted by the initiator client terminal, and (iii) all unencrypted partial values of the target value provided in respective response messages to the function message from the plurality of responding client terminals;

independently validating, by a respective processor executing client code locally stored on each of the responding client terminals including the selected responding client terminals and the non-selected responding client terminals, the selected at least one response according to the received (i), (ii), and (iii);

receiving, by the distributed smart contract function, a respective indication of the respective validation for the selected at least one response message from at least some of the responding client terminals including the selected responding client terminals and the non-selected responding client terminals;

in response to the received indication of validation of the selected at least one response message from the at least some of the responding client terminals including the selected responding client terminals and the non-selected responding client terminals, evaluating a consensus for the selected at least one response message amongst the responding client terminals by the distributed smart contract function according to a majority vote percentage computed as a number of indications of validations received from the at least some of the responding client terminals including the selected responding client terminals and the non-selected responding client terminals relative to a total number of responding client terminals that were provided (i), (ii), and (iii), and in response to the majority vote percentage being above a majority vote threshold, unlocking the locked funds by the distributed smart contract function for access by the initiator client terminal to receive the tender for the loan, and access by the non-selected responding client terminals for return of the non-selected tender, and creating, by the distributed smart contract function, a new block for storage in the blockchain, wherein the new block stores, for each of the selected at least one response messages from corresponding responding client terminals providing the indication of validation, the address of the respective responding client terminal, the partial amount, and the unencrypted parameter, wherein the new block is stored in a data storage device accessible to a third client terminal over the network.

23. A computer program product for decentralized and anonymous arrangement of a loan, using secure selection of at least one response message from a plurality of response messages including a combination of encrypted and unencrypted data processed by a distributed smart contract function of a distributed blockchain dataset, comprising:

a non-transitory memory having stored thereon a code of the distributed smart contract function of the distributed blockchain dataset for execution by at least one hardware processor of a network connected server, wherein the distributed smart contract is executed as a decentralized application without a third party intermediary, the code comprising instructions for:

receiving, by the distributed smart contract function, from an initiator client terminal, a function message including an unencrypted target value denoting a tender for a total amount of the loan, a threshold approval ratio defining a minimal percentage of the total amount of the loan that the initiator client terminal is willing to accept, and a public key associated with a corresponding private key stored by the initiator client terminal;

providing the functional message by the distributed smart contract function to a plurality of responding client terminals;

receiving respective response messages to the function message, by the distributed smart contract function, from a plurality of responding client terminals, each respective response comprising an unencrypted partial value of the target value and a parameter encrypted with the public key, the parameter denoting an interest rate for a partial amount of the total amount of the loan, each respective response denotes a bid for the partial amount of the total amount of the loan at the respective interest rate;

receiving by the distributed smart contract function from the plurality of responding client terminals, funds of the at least partial amount associated with each respective bid;

locking the funds received by the distributed smart contract function from the plurality of responding client terminal until at least one of: the tender is announced, and the tender times out without winners, wherein during the locking access to the locked funds is denied;

storing, by the distributed smart contract function, the response messages including the encrypted parameter and the unencrypted partial value received from the plurality of responding client terminals;

providing, by the distributed smart contract function, the initiator client terminal with access to the response messages including the encrypted parameter when a sum of the unencrypted partial values of the response messages is above the threshold approval ratio and/or when a timeout duration is met;

executing by client code stored on a storage device of the initiator client terminal performing computations off the blockchain using at least one hardware processor of the initiator client terminal, instructions for:

decrypting the parameter of each respective response with the private key, analyzing the respective response messages according to a ranking of the decrypted parameters of the respective response messages, and selecting the at least one response message according to the ranking of the decryption of the decrypted parameter denoting the interest rate for the partial amount of the total amount of the loan, wherein a sum of the unencrypted partial values of the selected at least one response message is according to a requirement of the target value;

receiving, by the distributed smart contract function, from the initiator client terminal, the selected at least one response message, and all decrypted parameters associated with all of the selected at least one response message that were decrypted by the initiator client terminal;

providing, by the distributed smart contract function to each of the plurality of responding client terminals that provided respective response messages to the function message, including selected responding client terminals that provided the selected at least one response message and non-selected responding client terminals that provided non-selected response messages: (i) the selected at least one response message, (ii) all decrypted parameters associated with all of the selected at least one response message that were decrypted by the initiator client terminal, and (iii) all unencrypted partial values of the target value provided in respective response messages to the function message from the plurality of responding client terminals;

independently validating, by a respective processor executing client code locally stored on each of the responding client terminals including the selected responding client terminals and the non-selected responding client terminals, the selected at least one response according to the received (i), (ii), and (iii);

receiving, by the distributed smart contract function, a respective indication of the respective validation for the selected at least one response message from at least some of the responding client terminals including the selected responding client terminals and the non-selected responding client terminals;

in response to the received indication of validation of the selected at least one response message from the at least some of the responding client terminals including the selected responding client terminals and the non-selected responding client terminals, evaluating a consensus for the selected at least one response message amongst the responding client terminals by the distributed smart contract function according to a majority vote percentage computed as a number of indications of validations received from the at least some of the responding client terminals including the selected responding client terminals and the non-selected responding client terminals relative to a total number of responding client terminals that were provided (i), (ii), and (iii), and in response to the majority vote percentage being above a majority vote threshold, unlocking the locked funds by the distributed smart contract function for access by the initiator client terminal to receive the tender for the loan, and access by the non-selected responding client terminals for return of the non-selected tender, and creating, by the distributed smart contract function, a new block for storage in the blockchain, wherein the new block stores, for each of the selected at least one response messages from corresponding responding client terminals providing the indication of validation, the address of the respective responding client terminal, the partial amount, and the unencrypted parameter, wherein the new block is stored in a data storage device accessible to a third client terminal over the network.

* * * * *